(12) United States Patent
Choi

(10) Patent No.: US 11,004,245 B2
(45) Date of Patent: May 11, 2021

(54) USER INTERFACE APPARATUS FOR VEHICLE AND VEHICLE

(71) Applicant: LG ELECTRONICS INC., Seoul (KR)

(72) Inventor: Sunghwan Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 16/045,136

(22) Filed: Jul. 25, 2018

(65) Prior Publication Data

US 2019/0035127 A1 Jan. 31, 2019

(30) Foreign Application Priority Data

Jul. 25, 2017 (KR) .................. 10-2017-0094280

(51) Int. Cl.
| | |
|---|---|
| *G06T 19/00* | (2011.01) |
| *G06T 11/60* | (2006.01) |
| *H04N 5/262* | (2006.01) |
| *H04N 5/272* | (2006.01) |
| *G06T 3/20* | (2006.01) |
| *B60R 1/00* | (2006.01) |
| *G05D 1/02* | (2020.01) |

(52) U.S. Cl.
CPC .............. *G06T 11/60* (2013.01); *B60R 1/00* (2013.01); *G06T 3/20* (2013.01); *H04N 5/2628* (2013.01); *H04N 5/272* (2013.01); *B60R 2300/105* (2013.01); *B60R 2300/30* (2013.01); *B60R 2300/305* (2013.01); *B60R 2300/306* (2013.01); *B60R 2300/307* (2013.01); *G05D 1/021* (2013.01); *G05D 2201/0213* (2013.01); *G06T 2200/24* (2013.01); *G06T 2210/22* (2013.01)

(58) Field of Classification Search
CPC .... G06T 19/006; H04N 5/45; H04N 21/4221; G06F 40/106; G08G 1/167
See application file for complete search history.

(56) References Cited

U.S. PATENT DOCUMENTS 5,835,880 A * 11/1998 Gan .................... G01S 5/16 701/466
9,251,708 B2 * 2/2016 Rosenbaum ......... G08G 1/165
10,101,891 B1 * 10/2018 Kulewski ............ G06F 3/04845
(Continued)

FOREIGN PATENT DOCUMENTS

| EP | 3100913 A2 | 12/2016 |
| KR | 10-2014-0132958 A | 11/2014 |

(Continued)

*Primary Examiner* — Phong X Nguyen
(74) *Attorney, Agent, or Firm* — Birch, Stewart, Kolasch & Birch, LLP

(57) ABSTRACT

A user interface apparatus for a vehicle including an interface unit; a display; a camera configured to capture a forward view image of the vehicle and a processor configured to display a cropped area of the forward view image on the display in which an object is present in displayed cropped area, display a first augmented reality (AR) graphic object overlaid onto the object present in the displayed cropped area, change the cropped area based on driving situation information received through the interface unit, and change the first AR graphic object to a second AR object based on the driving situation information.

16 Claims, 21 Drawing Sheets

(56) References Cited

U.S. PATENT DOCUMENTS

| | | | |
|---|---|---|---|
| 10,239,456 B1* | 3/2019 | Tao | B60R 1/00 |
| 2004/0267423 A1* | 12/2004 | Iwazaki | B62D 15/0285 |
| | | | 701/41 |
| 2008/0224837 A1* | 9/2008 | Meyer | B60Q 9/005 |
| | | | 340/435 |
| 2009/0097038 A1* | 4/2009 | Higgins-Luthman | |
| | | | B60G 17/019 |
| | | | 356/602 |
| 2010/0164702 A1* | 7/2010 | Sasaki | G01B 21/22 |
| | | | 340/438 |
| 2011/0043634 A1* | 2/2011 | Stegmann | B60R 1/00 |
| | | | 348/148 |
| 2013/0293683 A1* | 11/2013 | Zhou | H04N 5/23238 |
| | | | 348/47 |
| 2013/0321629 A1* | 12/2013 | Zhang | B60R 1/00 |
| | | | 348/148 |
| 2014/0336842 A1* | 11/2014 | Jang | G06K 9/00791 |
| | | | 701/1 |
| 2015/0019957 A1* | 1/2015 | Ying | G06F 40/106 |
| | | | 715/243 |
| 2015/0077562 A1* | 3/2015 | Heckel | G06T 19/006 |
| | | | 348/148 |
| 2015/0284001 A1* | 10/2015 | Watanabe | H04N 7/18 |
| | | | 701/36 |
| 2016/0182863 A1* | 6/2016 | Watanabe | H04N 7/181 |
| | | | 348/148 |
| 2016/0263997 A1 | 9/2016 | Mizutani | |
| 2016/0269645 A1* | 9/2016 | Khoe | H04N 5/23219 |
| 2017/0154554 A1* | 6/2017 | Tanaka | G09B 19/14 |
| 2017/0169612 A1* | 6/2017 | Cashen | G06T 19/20 |
| 2017/0254659 A1* | 9/2017 | Fukumoto | G01C 21/365 |
| 2017/0336222 A1* | 11/2017 | Yamaguchi | G02B 27/0101 |
| 2018/0061134 A1* | 3/2018 | Ota | B60K 35/00 |
| 2018/0345960 A1* | 12/2018 | Fujii | B62D 15/0255 |
| 2018/0354442 A1* | 12/2018 | Bergstrom | B60R 1/12 |
| 2019/0149774 A1* | 5/2019 | Watanabe | H04N 7/181 |
| | | | 348/148 |
| 2019/0258057 A1* | 8/2019 | Hada | B60K 35/00 |
| 2020/0031283 A1* | 1/2020 | Nakasho | B60R 1/00 |

FOREIGN PATENT DOCUMENTS

| | | |
|---|---|---|
| KR | 10-2015-0056323 A | 5/2015 |
| KR | 10-2016-0136932 A | 11/2016 |
| KR | 10-2017-0054026 A | 5/2017 |

* cited by examiner

USER INTERFACE APPARATUS FOR VEHICLE AND VEHICLE

CROSS-REFERENCE TO RELATED APPLICATION

This application claims the priority benefit of Korean Patent Application No. 10-2017-0094280, filed on Jul. 25, 2017 in the Korean Intellectual Property Office, the disclosure of which is incorporated herein by reference.

BACKGROUND OF THE INVENTION

1. Field of the Invention

The present invention relates to a user interface apparatus for vehicle, and a vehicle.

2. Description of the Related Art

A vehicle is an apparatus that moves in a direction desired by a user riding therein. A representative example of a vehicle may be an automobile. Recently, vehicles have been equipped with various types of sensors and electronic devices for convenience of a user. In particular, Advance Driver Assistance Systems (ADASs) are under study to improve driver convenience. In addition, efforts have been being made to develop an autonomous vehicle.

Recently, a user interface apparatus for a vehicle has been developed to display an augmented reality (AR) graphic object on a display. To implement augmented reality, it is necessary to acquire and use a forward view image.

However, a forward view image of the same area forward of a vehicle is output despite of a change in movement of the vehicle, and an AR graphic object may not match with the forward view image. As a result, it is not possible to provide a user with accurate information.

SUMMARY OF THE INVENTION

The present invention has been made in view of the above problems, and it is one object of the present invention to provide a user interface apparatus for a vehicle, which outputs an augmented reality (AR) graphic object in a flexible manner in response to a change in movement of the vehicle.

It is another object of the present invention to provide a vehicle including the user interface apparatus.

Objects of the present invention should not be limited to the aforementioned objects and other unmentioned objects will be clearly understood by those skilled in the art from the following description.

In accordance with an embodiment of the present invention, the above and other objects can be accomplished by the provision of a user interface apparatus for a vehicle, including: an interface unit, a display, a camera configured to capture a forward view image, and a processor configured to: receive information about an object located ahead of the vehicle through the interface unit; crop a part of the forward view image; control the display to overlay an augmented reality (AR) graphic object, corresponding to an object present in a crop area of the forward view image, on an image of the crop area of the forward view image; change the crop area based on driving situation information received through the interface unit; and control the display based on the driving situation information to change the AR graphic object.

The details of other embodiments are included in the following description and the accompanying drawings.

The embodiments of the present invention have one or more advantages as follows.

First, by changing a crop area appropriately in response to a change in movement of a vehicle, it is possible to provide an image suitable for a driving situation.

Second, by using an AR graphic object, it is possible to provide accurate information of which an occupant needs to be informed depending on a driving situation.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
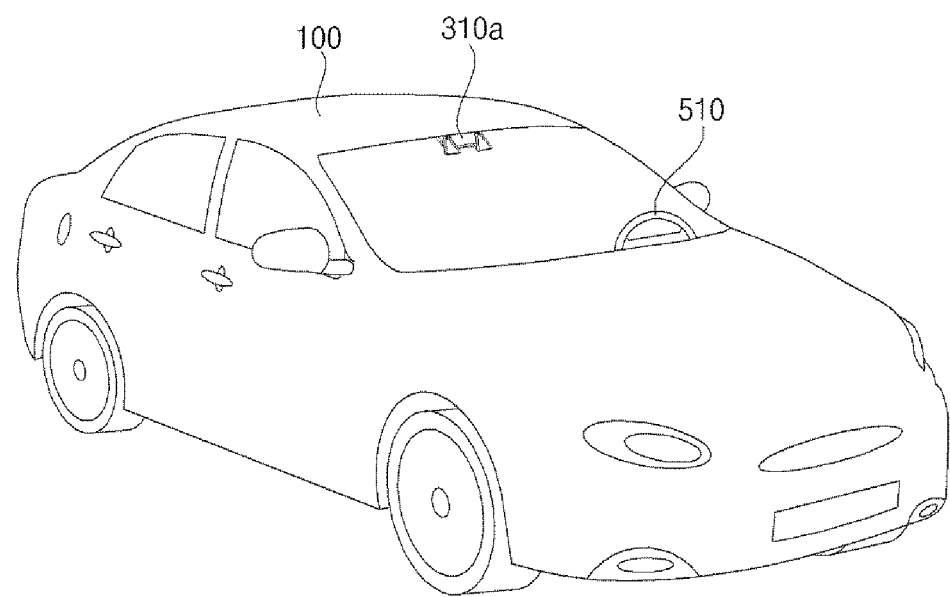
FIG. 1 is a view illustrating the external appearance of a vehicle according to an embodiment of the present invention.
Figure 1:
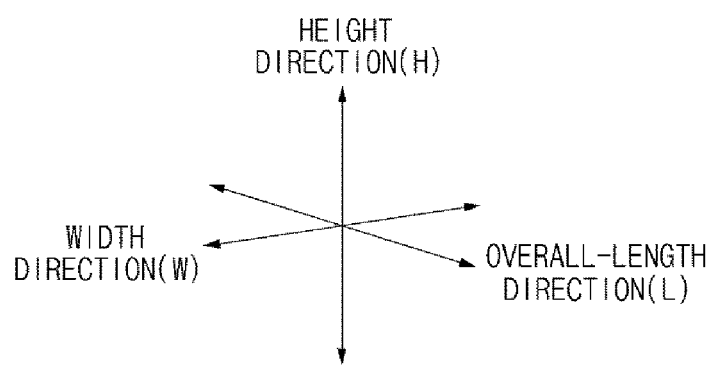
Figure 2:
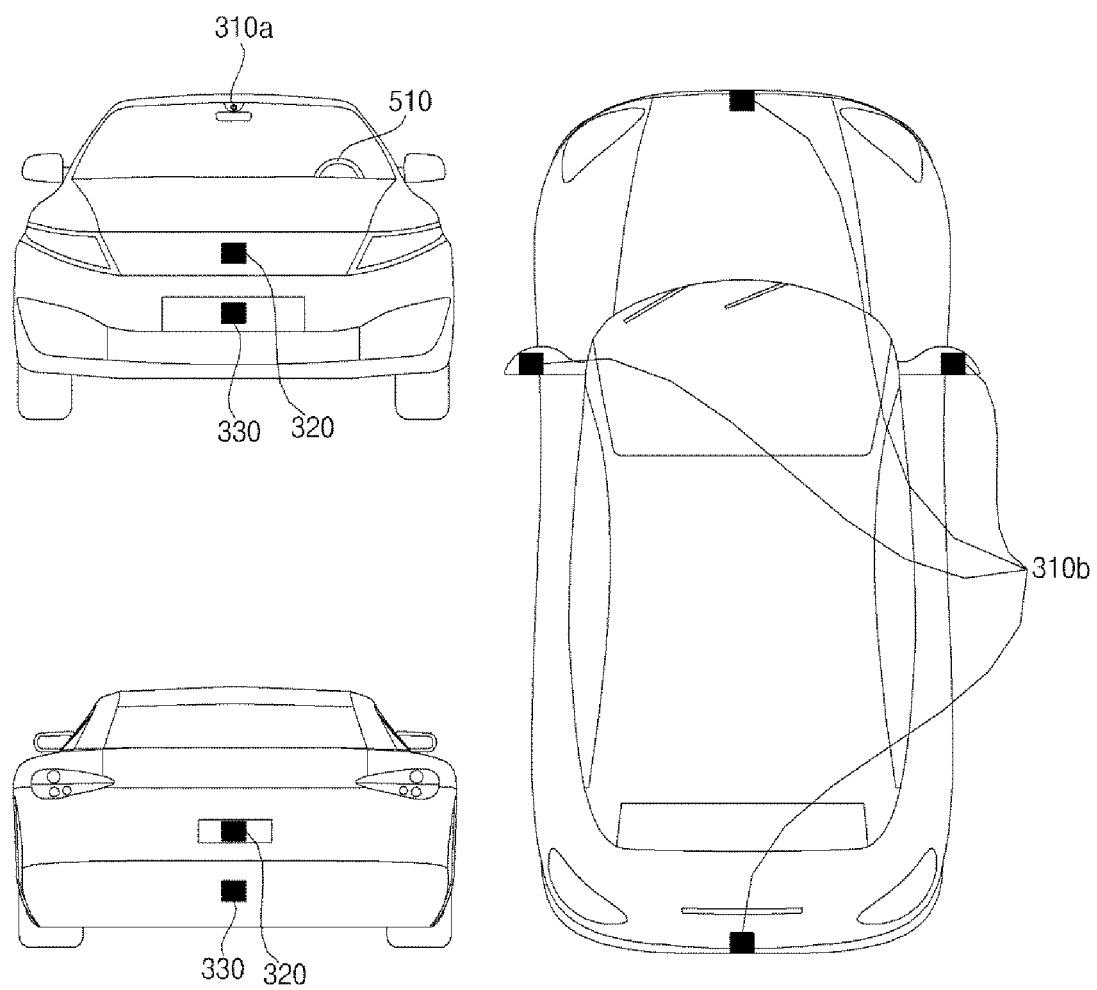
FIG. 2 includes different angled views of the external appearance of a vehicle according to an embodiment of the present invention.
Figure 3:
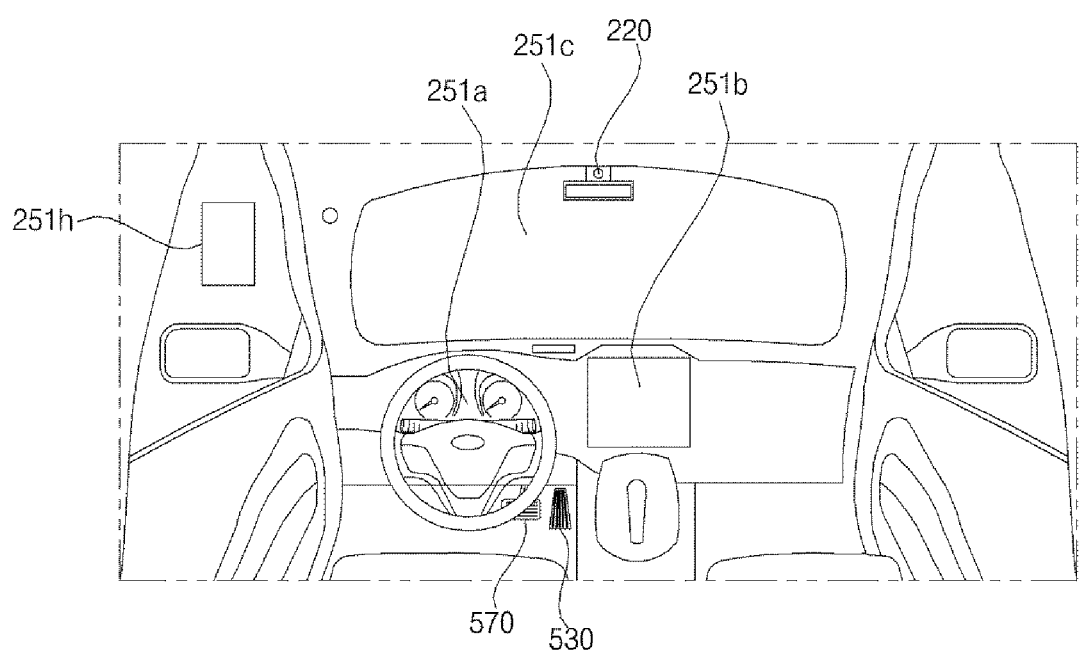
FIGS. 3 and 4 are views illustrating the interior configuration of a vehicle according to an embodiment of the present invention.
Figure 4:
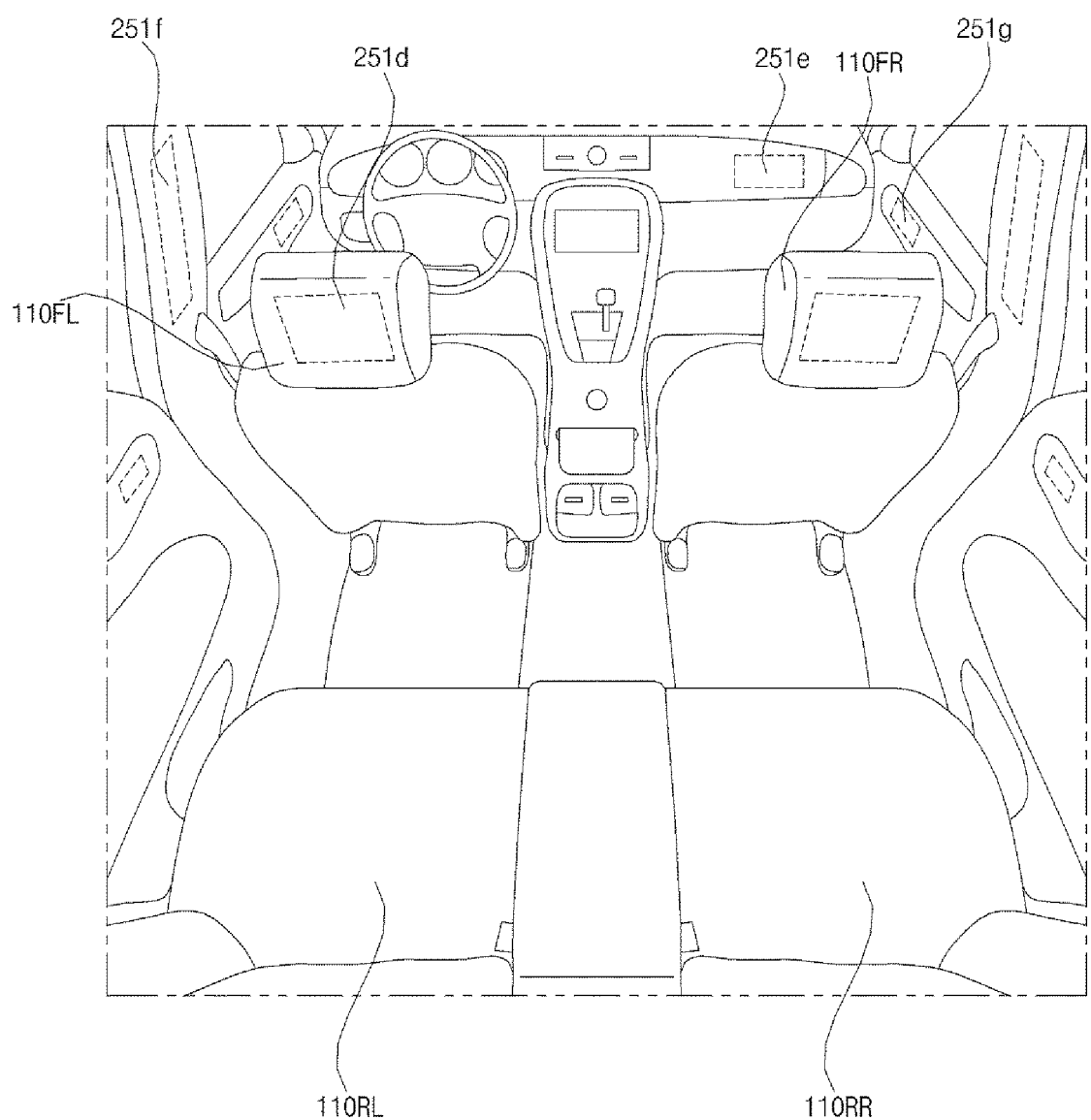

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

Although the terms "first," "second," etc., may be used herein to describe various components, these components should not be limited by these terms. These terms are only used to distinguish one component from another component.

When a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification includes an automobile and a motorcycle. Hereinafter, a description will be given based on an automobile. A vehicle as described in this specification includes all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Referring to FIGS. 1 to 7, a vehicle 100 includes a plurality of wheels rotated by a power source, and a steering input device 510 for controlling a driving direction of the vehicle 100.

The vehicle 100 may be an autonomous vehicle and switch to an autonomous driving mode or a manual mode in response to a user input. For example, in response to a user input received through a user interface apparatus 200, the vehicle 100 can switch from a manual mode to an autonomous driving mode, or vice versa.

The vehicle 100 can switch to the autonomous driving mode or to the manual mode based on driving situation information. The driving situation information may include at least one of the following: information on an object located outside the vehicle 100, navigation information, and vehicle state information.

For example, the vehicle 100 can switch from the manual mode to the autonomous driving mode, or vice versa, based on driving situation information generated by the object detection apparatus 300. The vehicle 100 can also switch from the manual mode to the autonomous driving mode, or vice versa, based on driving situation information received through a communication apparatus 400.

In addition, the vehicle 100 can switch from the manual mode to the autonomous driving mode, or vice versa, based on information, data, and a signal provided from an external device. When the vehicle 100 operates in the autonomous driving mode, the autonomous vehicle 100 can operate based on a vehicle travel system 700.

For example, the autonomous vehicle 100 can operate based on information, data, or signals generated by a driving system 710, a parking-out system 740, and a parking system 750. While operating in the manual mode, the autonomous vehicle 100 can receive a user input for driving of the vehicle 100 through a driving manipulation apparatus 500. In response to the user input received through the driving manipulation apparatus 500, the vehicle 100 can operate.

The term "overall length" means the length from the front end to the rear end of the vehicle 100, the term "overall width" means the width of the vehicle 100, and the term "overall height" means the height from the bottom of the wheel to the roof. In the following description, the term "overall length direction L" may mean the reference direction for the measurement of the overall length of the vehicle 100, the term "overall width direction W" may mean the reference direction for the measurement of the overall width of the vehicle 100, and the term "overall height direction H" may mean the reference direction for the measurement of the overall height of the vehicle 100.

Figure 7:
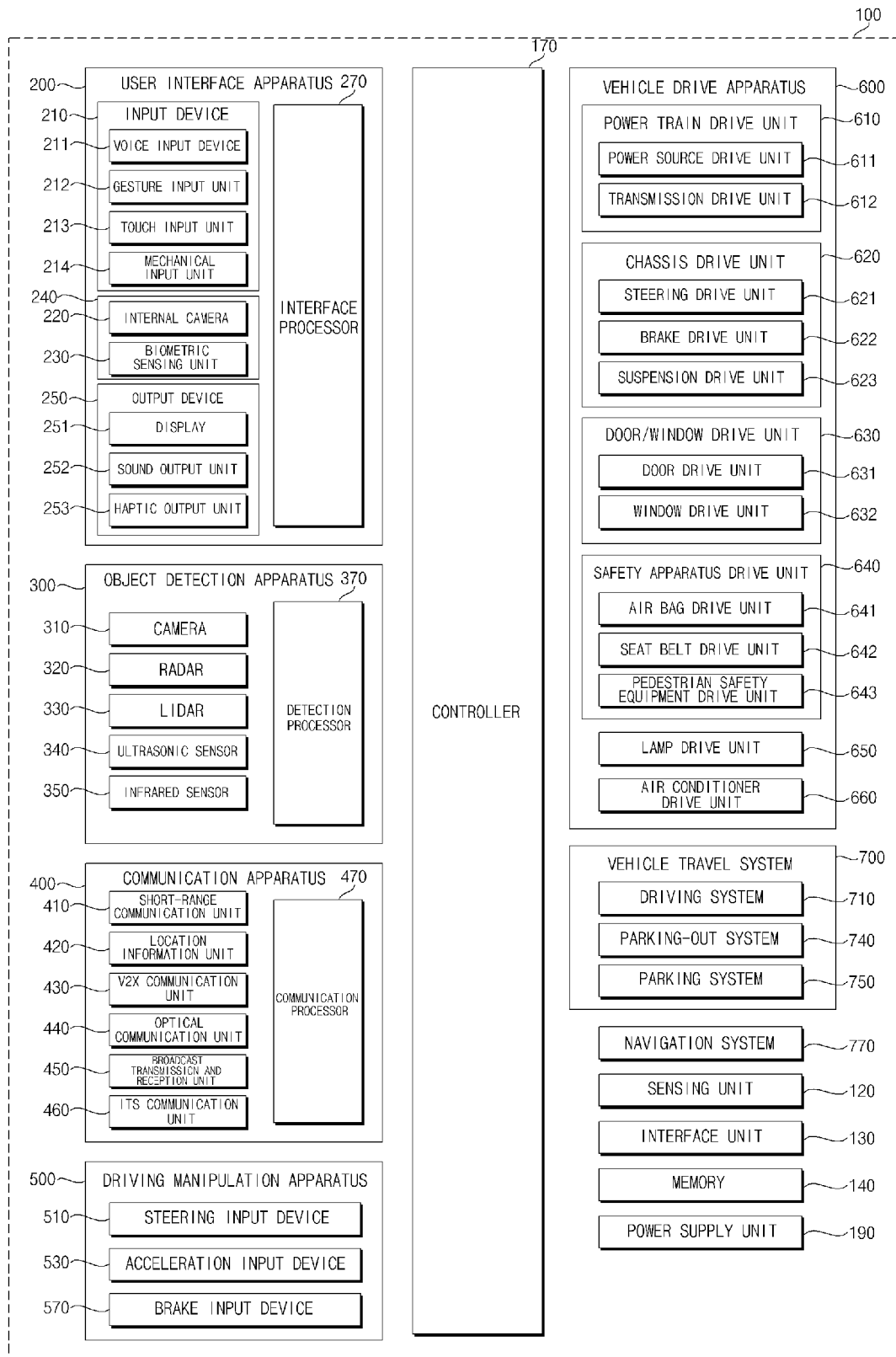
FIG. 7 is a block diagram illustrating a vehicle according to an embodiment of the present invention.

As illustrated in FIG. 7, the vehicle 100 may include the user interface apparatus 200, the object detection apparatus 300, the communication apparatus 400, the driving manipulation apparatus 500, a vehicle drive apparatus 600, the vehicle travel system 700, a navigation system 770, a sensing unit 120, an interface 130, a memory 140, a controller 170, and a power supply unit 190. The vehicle 100 may further include other components in addition to the aforementioned components, or may not include some of the aforementioned components.

The user interface apparatus 200 is provided to support communication between the vehicle 100 and a user. The user interface apparatus 200 can receive a user input, and provide information generated in the vehicle 100 to the user. The vehicle 100 can also enable User Interfaces (UI) or User Experience (UX) through the user interface apparatus 200.

As shown, the user interface apparatus 200 may include an input device 210, an internal camera 220, a biometric sensing unit 230, an output device 250, and a processor 270. The user interface apparatus 200 may further include other components in addition to the aforementioned components, or may not include some of the aforementioned components.

In addition, the input device 210 is configured to receive information from a user, and data collected in the input device 210 can be analyzed by the processor 270 and then processed into a control command of the user. The input device 210 may be disposed inside the vehicle 100. For example, the input device 210 can be disposed in a region of a steering wheel, a region of an instrument panel, a region of a seat, a region of each pillar, a region of a door, a region of a center console, a region of a head lining, a region of a sun visor, a region of a windshield, or a region of a window.

The input device 210 may include a voice input unit 211, a gesture input unit 212, a touch input unit 213, and a mechanical input unit 214. The voice input unit 211 can convert a voice input of a user into an electrical signal. The converted electrical signal can then be provided to the processor 270 or the controller 170. The voice input unit 211 may also include one or more microphones.

The gesture input unit 212 can convert a gesture input of a user into an electrical signal. The converted electrical signal can then be provided to the processor 270 or the controller 170. The gesture input unit 212 may include at least one of an infrared sensor and an image sensor for sensing a gesture input of a user.

The gesture input unit 212 can sense a three-dimensional (3D) gesture input of a user. Thus, the gesture input unit 212 may include a plurality of light emitting devices for outputting infrared light, or a plurality of image sensors. The gesture input unit 212 can sense a 3D gesture input by employing a Time of Flight (TOF) scheme, a structured light scheme, or a disparity scheme.

The touch input unit 213 can convert a user's touch input into an electrical signal. The converted electrical signal can then be provided to the processor 270 or the controller 170. The touch input unit 213 may include a touch sensor for sensing a touch input of a user.

In addition, the touch input device 210 may be formed integral with a display 251 to implement a touch screen. The touch screen provides an input interface and an output interface between the vehicle 100 and the user.

The mechanical input unit 214 may include at least one of a button, a dome switch, a jog wheel, and a jog switch. An electrical signal generated by the mechanical input unit 214 may be provided to the processor 270 or the controller 170. The mechanical input unit 214 may be located on a steering wheel, a center fascia, a center console, a cockpit module, a door, etc.

The internal camera 220 can acquire images of the inside of the vehicle 100. The processor 270 can sense a user's condition based on the images of the inside of the vehicle 100. The processor 270 can also acquire information on an eye gaze of the user. Further, the processor 270 can sense a gesture of the user from the images of the inside of the vehicle 100.

The biometric sensing unit 230 can acquire biometric information of the user. The biometric sensing unit 230 may include a sensor for acquire biometric information of the user, and can utilize the sensor to acquire finger print information, and heart rate information of the user. The biometric information may also be used for user authentication.

The output device 250 generates a visual, audio, or tactile output and may include at least one of a display 251, a sound output unit 252, and a haptic output unit 253.

The display 251 can display graphic objects corresponding to various types of information. The display 251 may include at least one of a Liquid Crystal Display (LCD), a Thin Film Transistor-Liquid Crystal Display (TFT LCD), an Organic Light-Emitting Diode (OLED), a flexible display, a 3D display, and an e-ink display.

The display 251 may form an inter-layer structure together with the touch input unit 213, or may be integrally formed with the touch input unit 213 to implement a touch screen. The display 251 may also be implemented as a Head Up Display (HUD). When implemented as a HUD, the display 251 may include a projector module in order to output information through an image projected on a windshield or a window.

The display 251 may include a transparent display. The transparent display may be attached on the windshield or the window. In addition, the transparent display can display a predetermined screen with a predetermined transparency. In order to achieve the transparency, the transparent display may include at least one of a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

Further, the user interface apparatus 200 may include a plurality of displays 251a to 251g. For example, the display 251 may be disposed in a region of a steering wheel, a region 251a, 251b, or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. Thus, the sound output unit 252 may include one or more speakers.

The haptic output unit 253 generates a tactile output. For example, the haptic output unit 253 can operate to vibrate a steering wheel, a safety belt, and seats 110FL, 110FR, 110RL, and 110RR to allow a user to recognize the output. The processor 270 can also control the overall operation of each unit of the user interface apparatus 200.

The user interface apparatus 200 may include a plurality of processors 270 or may not include the processor 270. When the user interface apparatus 200 does not include the processor 270, the user interface apparatus 200 can operate under control of the controller 170 or a processor of a different device inside the vehicle 100.

Further, the user interface apparatus 200 may be referred to as a display device for vehicle. The user interface apparatus 200 can also operate under control of the controller 170.

The object detection apparatus 300 can detect an object outside the vehicle 100 and generate information on the object based on sensing data. The information on the object may include information about the presence of the object, location information of the object, information on a distance between the vehicle 100 and the object, and information on a speed of movement of the vehicle 100 relative to the object. The object may include various objects related to travelling of the vehicle 100.

Figure 5:
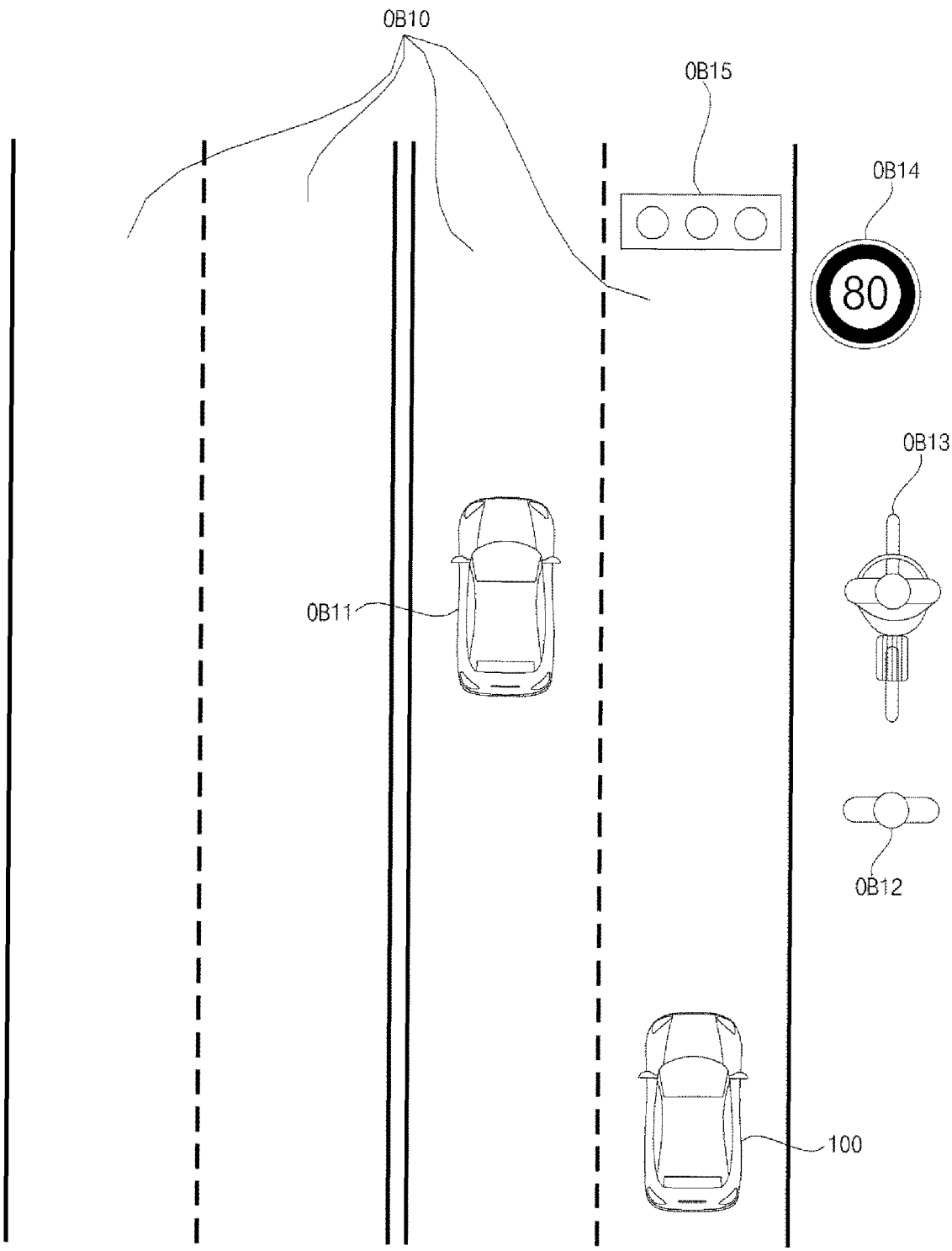
FIGS. 5 and 6 are views for explanation of an object according to an embodiment of the present invention.
Figure 6:
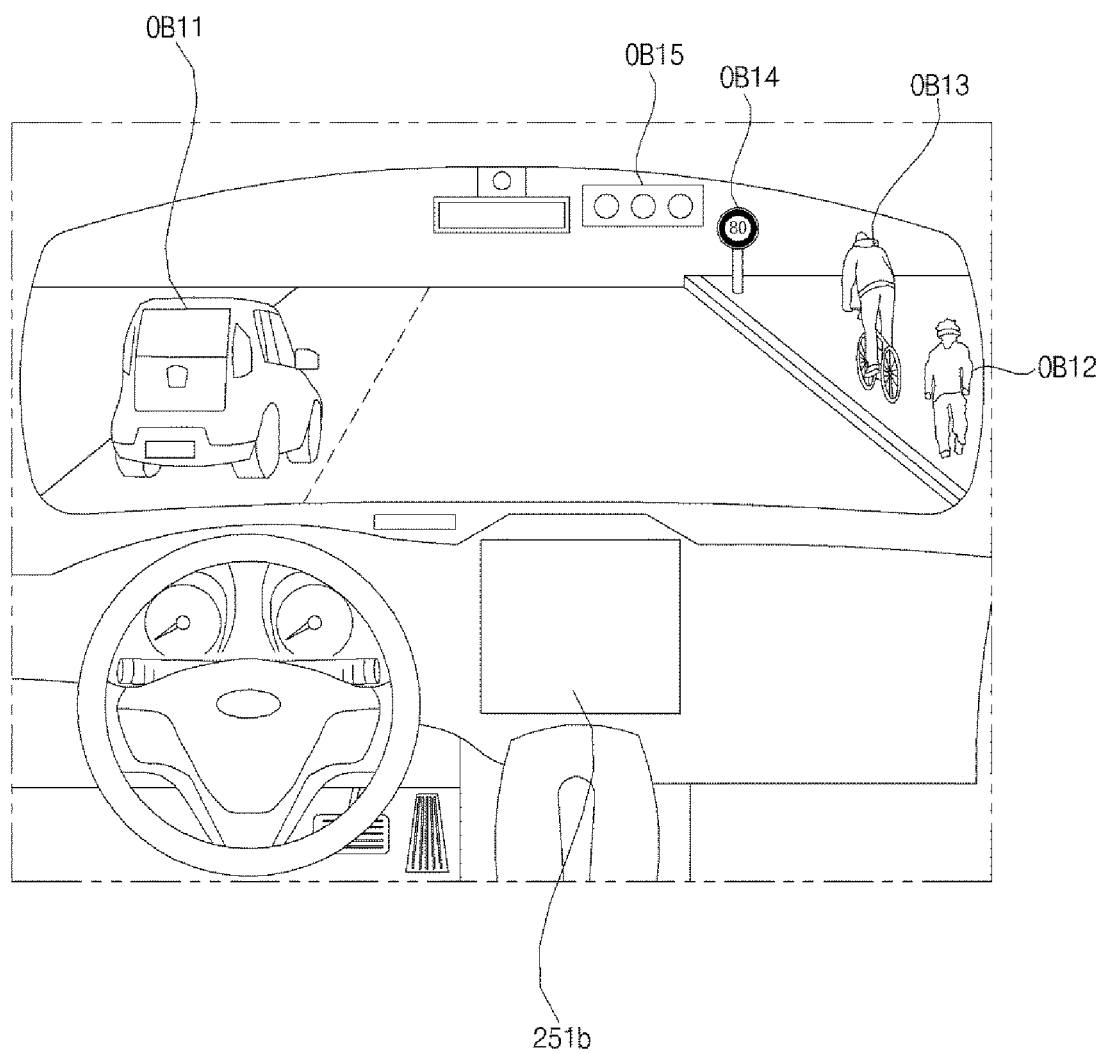

Referring to FIGS. 5 and 6, an object o includes a lane OB10, a nearby vehicle OB11, a pedestrian OB12, a two-wheeled vehicle OB13, a traffic signal OB14 and OB15, a light, a road, a structure, a bump, a geographical feature, an animal, etc. The lane OB10 may be a lane in which the vehicle 100 is traveling, a lane next to the lane in which the vehicle 100 is traveling, or a lane in which a different vehicle is travelling in the opposite direction. The lane OB10 may include left and right lines that define the lane. The lane may be a concept including an intersection.

The nearby vehicle OB11 can be a vehicle that is travelling in the vicinity of the vehicle 100. The nearby vehicle OB11 may be a vehicle within a predetermined distance from the vehicle 100. For example, the nearby vehicle OB11 may be a vehicle that is preceding or following the vehicle 100.

The pedestrian OB12 may be a person located in the vicinity of the vehicle 100. The pedestrian OB12 may be a person within a predetermined distance from the vehicle 100. For example, the pedestrian OB12 may be a person on a sidewalk or on the roadway.

The two-wheeled vehicle OB13 is a vehicle located in the vicinity of the vehicle 100 and moves with two wheels. The two-wheeled vehicle OB13 may be a vehicle that has two wheels within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface. The light may be light generated by a lamp provided in the nearby vehicle. The light may be light generated by a street light. The light may be solar light.

The road may include a road surface, a curve, and slopes, such as an upward slope and a downward slope. The structure may be a body located around the road in the state of being fixed onto the ground. For example, the structure may include a streetlight, a roadside tree, a building, a traffic light, a bridge, a curb, and a wall.

The geographical feature may include a mountain and a hill. Further, the object may be classified as a movable object or a stationary object. For example, the movable object may be a concept including a moving nearby vehicle and a moving pedestrian. In addition, the stationary object may be a concept including a traffic signal, a road, a structure, a stopped nearby vehicle, and a stopped pedestrian.

The object detection apparatus 300 may include a camera 310, a radar 320, a lidar 330, an ultrasonic sensor 340, an infrared sensor 350, and a processor 370. The object detection apparatus 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310a, an Around View Monitoring (AVM) camera 310b, or a 360-degree camera.

Using various image processing algorithms, the camera 310 can acquire location information of an object, information on a distance to the object, and information on speed relative to the object. For example, based on change in size over time of an object in acquired images, the camera 310 can acquire information on a distance to the object and information on speed relative to the object.

For example, the camera 310 can acquire the information on a distance to the object and the information on speed relative to the object, by using a pin hole model or profiling a road surface. Further, the camera 310 can acquire the information on a distance to the object and the information on the speed relative to the object, based on information on disparity in stereo images acquired by a stereo camera 310a.

In addition, the camera 310 may be disposed near a front windshield in the vehicle 100 in order to acquire images of the front of the vehicle 100. Alternatively, the camera 310 may be disposed around a front bumper or a radiator grill. For example, the camera 310 may be disposed near a rear glass in the vehicle 100 in order to acquire images of the rear of the vehicle 100. Alternatively, the camera 310 may be disposed around a rear bumper, a trunk, or a tailgate.

The camera 310 may also be disposed near at least one of the side windows in the vehicle 100 in order to acquire images of the side of the vehicle 100. Alternatively, the camera 310 may be disposed around a side mirror, a fender, or a door. The camera 310 also provides an acquired image to the processor 370.

The radar 320 may include an electromagnetic wave transmission unit and an electromagnetic wave reception unit. The radar 320 may also be realized as a pulse radar or a contIMUous wave radar depending on the principle of emission of an electronic wave. In addition, the radar 320 may be realized as a Frequency Modulated ContIMUous Wave (FMCW) type radar or a Frequency Shift Keying (FSK) type radar depending on the waveform of a signal.

The radar 320 can detect an object through the medium of an electromagnetic wave by employing a time of flight (TOF) scheme or a phase-shift scheme, and can detect a location of the detected object, the distance to the detected object, and the speed relative to the detected object The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme. The lidar 330 may also be implemented as a drive type lidar or a non-drive type lidar. When implemented as the drive type lidar, the lidar 300 can rotate by a motor and detect an object in the vicinity of the vehicle 100.

When implemented as the non-drive type lidar, the lidar 300 may utilize a light steering technique to detect an object located within a predetermined distance from the vehicle 100. The vehicle 100 may include a plurality of non-driving type lidars 330.

The lidar 330 can detect an object through the medium of laser light by employing the TOF scheme or the phase-shift scheme, and can detect a location of the detected object, the distance to the detected object, and the speed relative to the detected object.

The lidar 330 may be located at an appropriate position outside the vehicle 100 in order to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 can detect an object based on an ultrasonic wave, and can detect a location of the detected object, the distance to the detected object, and the speed relative to the detected object.

The ultrasonic sensor 340 may be located at an appropriate position outside the vehicle 100 in order to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 340 can detect an object based on infrared light, and can detect a location of the detected object, the distance to the detected object, and the speed relative to the detected object.

The infrared sensor 350 may be located at an appropriate position outside the vehicle 100 in order to sense an object located in front of the vehicle 100, an object located to the rear of the vehicle 100, or an object located to the side of the vehicle 100.

The processor 370 can control the overall operation of each unit of the object detection apparatus 300. The processor 370 can detect or classify an object by comparing pre-stored data with data sensed by the camera 310, the radar 320, the lidar 330, the ultrasonic sensor 340, and the infrared sensor 350.

The processor 370 can detect and track an object based on acquired images. The processor 370 may, for example, calculate the distance to the object and the speed relative to the object. For example, the processor 370 can acquire information on the distance to the object and information on the speed relative to the object based on a variation in size over time of the object in acquired images.

For example, the processor 370 can acquire information on the distance to the object or information on the speed relative to the object by using a pin hole model or by profiling a road surface. For example, the processor 370 can acquire information on the distance to the object and information on the speed relative to the object based on information on disparity in stereo images acquired from the stereo camera 310a.

The processor 370 can detect and track an object based on a reflection electromagnetic wave which is formed as a result of reflection a transmission electromagnetic wave by the object. Based on the electromagnetic wave, the processor 370 can, for example, calculate the distance to the object and the speed relative to the object.

The processor 370 can detect and track an object based on a reflection laser light which is formed as a result of reflection of transmission laser by the object. Based on the laser light, the processor 370 can, for example, calculate the distance to the object and the speed relative to the object.

In addition, the processor 370 can detect and track an object based on a reflection ultrasonic wave which is formed as a result of reflection of a transmission ultrasonic wave by the object. Based on the ultrasonic wave, the processor 370 can, for example, calculate the distance to the object and the speed relative to the object.

The processor 370 can detect and track an object based on reflection infrared light which is formed as a result of reflection of transmission infrared light by the object. Based on the infrared light, the processor 370 can, for example, calculate the distance to the object and the speed relative to the object.

The object detection apparatus 300 may include a plurality of processors 370 or may not include the processor 370. For example, each of the camera 310, the radar 320, the lidar 330, the ultrasonic sensor 340, and the infrared sensor 350 may include its own processor.

When the object detection apparatus 300 does not include the processor 370, the object detection apparatus 300 can operate under control of the controller 170 or a processor inside the vehicle 100. The object detection apparatus 300 can operate under control of the controller 170.

The communication apparatus 400 is configured to perform communication with an external device. Here, the external device may be a nearby vehicle, a mobile terminal, or a server. To perform communication, the communication apparatus 400 may include at least one of a transmission antenna, a reception antenna, a Radio Frequency (RF) circuit capable of implementing various communication protocols, and an RF device.

The communication apparatus 400 may include a short-range communication unit 410, a location information unit 420, a V2X communication unit 430, an optical communication unit 440, a broadcast transmission and reception unit 450, an Intelligent Transport Systems (ITS) communication unit 460, and a processor 470.

The communication apparatus 400 may further include other components in addition to the aforementioned components, or may not include some of the aforementioned components.

The short-range communication unit 410 is configured to perform short-range communication. The short-range communication unit 410 may support short-range communication using at least one of Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus). The short-range communication unit 410 may form wireless area networks to perform short-range communication between the vehicle 100 and at least one external device.

The location information unit 420 can acquire location information of the vehicle 100. For example, the location information unit 420 may include a Global Positioning System (GPS) module or a Differential Global Positioning System (DGPS) module.

The V2X communication unit 430 can perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 can perform communication with an external device through the medium of light. The optical communication unit 440 may include a light emitting unit, which converts an electrical signal into an optical signal and transmits the optical signal to the outside, and a light receiving unit which converts a received optical signal into an electrical signal. The light emitting unit may be integrally formed with a lamp provided included in the vehicle 100.

The broadcast transmission and reception unit 450 can receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 can exchange information, data, or signals with a traffic system. The ITS communication unit 460 may provide acquired information or data to the traffic system. The ITS communication unit 460 can receive information, data, or signals from the traffic system. For example, the ITS communication unit 460 can receive traffic volume information from the traffic system and provide the traffic volume information to the controller 170. In another example, the ITS communication unit 460 can receive a control signal from the traffic system, and provide the control signal to the controller 170 or a processor provided in the vehicle 100.

The processor 470 can control the overall operation of each unit of the communication apparatus 400. The communication apparatus 400 may include a plurality of processors 470, or may not include the processor 470. When the communication apparatus 400 does not include the processor 470, the communication apparatus 400 can operate under control of the controller 170 or a processor of a device inside of the vehicle 100.

Further, the communication apparatus 400 may implement a vehicle display device, together with the user interface apparatus 200. In this instance, the vehicle display device may be referred to as a telematics device or an Audio Video Navigation (AVN) device. The communication apparatus 400 can operate under control of the controller 170.

The driving manipulation apparatus 500 can receive a user input for driving the vehicle 100. In the manual mode, the vehicle 100 can operate based on a signal provided by the driving manipulation apparatus 500. The driving manipulation apparatus 500 may include a steering input device 510, an acceleration input device 530, and a brake input device 570. The steering input device 510 can receive a user input with regard to the direction of travel of the vehicle 100. The steering input device 510 may take the form of a wheel to enable a steering input through the rotation thereof. The steering input device may be provided as a touchscreen, a touch pad, or a button.

The acceleration input device 530 can receive a user input for acceleration of the vehicle 100. The brake input device 570 can receive a user input for deceleration of the vehicle 100. Each of the acceleration input device 530 and the brake input device 570 may take the form of a pedal. The acceleration input device or the break input device may also be configured as a touch screen, a touch pad, or a button.

The driving manipulation apparatus 500 can operate under control of the controller 170. The vehicle drive apparatus 600 is configured to electrically control the operation of various devices of the vehicle 100.

In addition, the vehicle drive apparatus 600 may include a power train drive unit 610, a chassis drive unit 620, a door/window drive unit 630, a safety apparatus drive unit 640, a lamp drive unit 650, and an air conditioner drive unit 660. The vehicle drive apparatus 600 may further include other components in addition to the aforementioned components, or may not include some of the aforementioned components.

Further, the vehicle drive apparatus 600 may include a processor. Each unit of the vehicle drive apparatus 600 may also include its own processor. The power train drive unit 610 can control the operation of a power train. The power train drive unit 610 may include a power source drive unit 611 and a transmission drive unit 612.

The power source drive unit 611 can control a power source of the vehicle 100. When a fossil fuel-based engine is the power source, the power source drive unit 611 can perform electronic control of the engine. As such the power source drive unit 611 can control, for example, the output torque of the engine. The power source drive unit 611 can adjust the output toque of the engine under control of the controller 170.

When an electric motor is the power source, the power source drive unit 611 can control the motor. The power source drive unit 611 can control, for example, the RPM and toque of the motor under control of the controller 170.

The transmission drive unit 612 can control a transmission. The transmission drive unit 612 can adjust the state of the transmission. The transmission drive unit 612 can also adjust a state of the transmission to a drive (D), reverse (R), neutral (N), or park (P) state.

Further, when an engine is the power source, the transmission drive unit 612 can adjust a gear-engaged state to the drive position D. The chassis drive unit 620 can control the operation of a chassis. The chassis drive unit 620 may include a steering drive unit 621, a brake drive unit 622, and a suspension drive unit 623.

The steering drive unit 621 can perform electronic control of a steering apparatus provided inside the vehicle 100. The steering drive unit 621 can change the direction of travel of the vehicle 100. The brake drive unit 622 can perform electronic control of a brake apparatus provided inside the vehicle 100. For example, the brake drive unit 622 can reduce the speed of the vehicle 100 by controlling the operation of a brake located at a wheel.

Further, the brake drive unit 622 can control a plurality of brakes individually. The brake drive unit 622 may apply a different degree-braking force to each wheel. The suspension drive unit 623 can perform electronic control of a suspension apparatus inside the vehicle 100. For example, when the road surface is uneven, the suspension drive unit 623 can control the suspension apparatus to reduce the vibration of the vehicle 100.

Further, the suspension drive unit 623 can control a plurality of suspensions individually. The door/window drive unit 630 can perform electronic control of a door apparatus or a window apparatus inside the vehicle 100.

The door/window drive unit 630 may include a door drive unit 631 and a window drive unit 632. The door drive unit 631 can control the door apparatus and can also control opening or closing of a plurality of doors included in the vehicle 100. The door drive unit 631 can control an opening or closing of a trunk or a tail gate and control opening or closing of a sunroof.

The window drive unit 632 can perform electronic control of the window apparatus. The window drive unit 632 can control opening or closing of a plurality of windows included in the vehicle 100. The safety apparatus drive unit 640 can perform electronic control of various safety apparatuses provided inside the vehicle 100.

The safety apparatus drive unit 640 may include an airbag drive unit 641, a safety belt drive unit 642, and a pedestrian protection equipment drive unit 643. The airbag drive unit 641 can perform electronic control of an airbag apparatus inside the vehicle 100. For example, upon detection of a dangerous situation, the airbag drive unit 641 can control an airbag to be deployed.

The safety belt drive unit 642 can perform electronic control of a seatbelt apparatus inside the vehicle 100. For example, upon detection of a dangerous situation, the safety belt drive unit 642 can control passengers to be fixed onto seats 110FL, 110FR, 110RL, and 110RR with safety belts.

The pedestrian protection equipment drive unit 643 can perform electronic control of a hood lift and a pedestrian airbag. For example, upon detection of a collision with a pedestrian, the pedestrian protection equipment drive unit 643 can control a hood lift and a pedestrian airbag to be deployed. The lamp drive unit 650 can perform electronic control of various lamp apparatuses provided inside the vehicle 100.

The air conditioner drive unit 660 can perform electronic control of an air conditioner inside the vehicle 100. For example, when the inner temperature of the vehicle 100 is high, an air conditioner drive unit 660 can operate the air conditioner to supply cool air to the inside of the vehicle 100.

The vehicle drive apparatus 600 may include a processor. Each unit of the vehicle dive device 600 may include its own processor. The vehicle drive apparatus 600 can operate under control of the controller 170.

The vehicle travel system 700 is a system for controlling the overall driving operation of the vehicle 100. The vehicle travel system 700 can operate in the autonomous driving mode and may include the driving system 710, the parking-out system 740, and the parking system 750. The vehicle travel system 700 may further include other components in addition to the aforementioned components, or may not include some of the aforementioned component.

Further, the vehicle travel system 700 may include a processor and each unit of the vehicle travel system 700 may include its own processor. When the vehicle travel system 700 is implemented as software, the vehicle travel system 700 may be a subordinate concept of the controller 170.

Further, the vehicle travel system 700 may be a concept including at least one of the user interface apparatus 200, the object detection apparatus 300, the communication apparatus 400, the driving manipulation apparatus 500, the vehicle drive apparatus 600, the navigation system 770, the sensing unit 120, and the controller 170.

In addition, the driving system 710 can perform driving of the vehicle 100 by providing a control signal to the vehicle drive apparatus 600 based on navigation information from the navigation system 770. The driving system 710 can also perform driving of the vehicle 100 by providing a control signal to the vehicle drive apparatus 600 based on information on an object received from the object detection apparatus 300. Further, the driving system 710 can perform driving of the vehicle 100 by providing a control signal to the vehicle drive apparatus 600 based on a signal from an external device through the communication apparatus 400.

The driving system 710 includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs driving of the vehicle 100. The driving system 710 may also be referred to as a vehicle driving control apparatus.

The parking-out system 740 can perform an operation of pulling the vehicle 100 out of a parking space. For example, the parking-out system 740 can perform an operation of pulling the vehicle 100 out of a parking space, by providing a control signal to the vehicle drive apparatus 600 based on navigation information from the navigation system 770.

The parking-out system 740 can also perform an operation of pulling the vehicle 100 out of a parking space, by providing a control signal to the vehicle drive apparatus 600 based on information on an object received from the object detection apparatus 300. Further, the parking-out system 740 can perform an operation of pulling the vehicle 100 out of a parking space, by providing a control signal to the vehicle drive apparatus 600 based on a signal received from an external device.

The parking-out system 740 includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of pulling the vehicle 100 out of a parking space. The parking-out system 740 may be referred to as a vehicle parking-out control apparatus and can perform an operation of parking the vehicle 100 in a parking space.

The parking system 750 can also perform an operation of parking the vehicle 100 in a parking space, by providing a control signal to the vehicle drive apparatus 600 based on navigation information from the navigation system 770. The parking system 750 can perform an operation of parking the vehicle 100 in a parking space, by providing a control signal to the vehicle drive apparatus 600 based on information on an object received from the object detection apparatus 300.

Further, the parking system 750 can perform an operation of parking the vehicle 100 in a parking space, by providing a control signal to the vehicle drive apparatus 600 based on a signal from an external device. The parking system 750 may be a system which includes at least one of the user interface apparatus 200, the object detection apparatus 300, the communication apparatus 400, the driving manipulation apparatus 500, the vehicle driving device 600, the navigation system 770, the sensing unit 120, and the controller 170, and which performs an operation of parking the vehicle 100. The parking system 750 may be referred to as a vehicle parking control apparatus.

In addition, the navigation system 770 provides navigation information such as map information, information on a set destination, information on a route to the set destination, information on various objects along the route, lane information, and information on a current location of the vehicle.

The navigation system 770 may also include a memory and a processor. The memory may store navigation information. In addition, the processor can control the operation of the navigation system 770 and may update pre-stored information by receiving information from an external device through the communication apparatus 400. The navigation system 770 may be classified as an element of the user interface apparatus 200.

In addition, the sensing unit 120 can sense the state of the vehicle and may include an Inertial Measurement Unit (IMU) sensor, a collision sensor, a wheel sensor, a speed sensor, a gradient sensor, a weight sensor, a heading sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

Further, the IMU sensor may include at least one of an accelerometer, a gyro sensor, and a magnetic sensor. The sensing unit 120 can acquire sensing signals with regard to, for example, vehicle attitude information, vehicle motion information, vehicle yaw information, vehicle roll information, vehicle pitch information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 120 can generate vehicle state information based on sensing data. The vehicle state information may be information that is generated based on data sensed by various sensors provided inside the vehicle 100. For example, the vehicle state information may include vehicle position information, vehicle speed information, vehicle tilt information, vehicle weight information, vehicle direction information, vehicle battery information, vehicle fuel information, vehicle tire pressure information, vehicle steering information, in-vehicle temperature information, in-vehicle humidity information, pedal position information, vehicle engine temperature information, etc.

The interface 130 serves as a passage for various kinds of external devices that are connected to the vehicle 100. For example, the interface 130 may have a port that is connectable to a mobile terminal and may be connected to the mobile terminal via the port. In this instance, the interface 130 can exchange data with the mobile terminal.

Further, the interface 130 serves as a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170 and can store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In addition, the memory 140 may be integrally formed with the controller 170, or may be provided as an element of the controller 170. The controller 170 can control the overall operation of each unit inside the vehicle 100 and may be referred to as an Electronic Controller (ECU).

The power supply unit 190 can supply power required to operate each component under control of the controller 170. In particular, the power supply unit 190 can receive power from, for example, a battery inside the vehicle 100.

At least one processor and the controller 170 included in the vehicle 100 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

Figure 8:
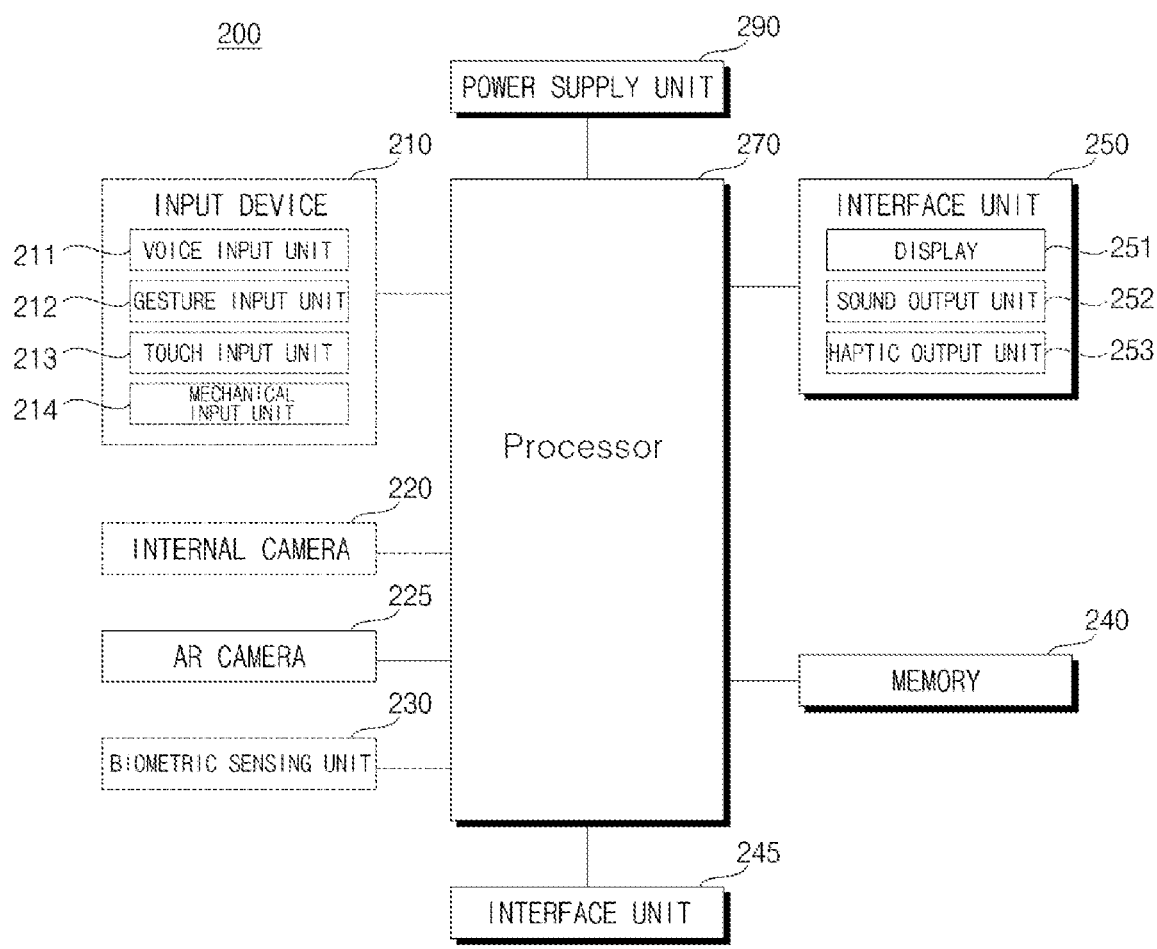
FIG. 8 is a block diagram illustrating a user interface apparatus for vehicle according to an embodiment of the present invention.

Next, FIG. 8 is a block diagram illustrating a user interface apparatus for a vehicle according for vehicle to an embodiment of the present invention. Referring to FIG. 8, a user interface apparatus 200 for a vehicle may include an AR camera 225, a memory 240, an interface unit 245, an output device 250, a processor 270, and a power supply unit 290.

The user interface apparatus 200 may further include an input device 210, an internal camera 220 and a biometric sensing unit 230 individually or in combination. Relevant description provided above with reference to FIG. 7 may also be applied to the input device 210.

The input device 210 can receive a user input through at least one of the voice input unit 211, the gesture input unit 212, a touch input unit 213, and a mechanical input unit 214. The input device 210 can receive a user input for changing a crop area of a forward view image of the vehicle 100.

The input device 210 can receive a first user input. The first user input may be a user input for stopping changing of a crop area. The input device 210 can receive a second user input. For example, the second user input may be a user input for changing a size of a crop area. Relevant description provided above with reference to FIG. 7 may be applied to the internal camera 220.

The AR camera 225 can capture a forward view image of the vehicle 100 and may be disposed inside the vehicle 100 while being directed forward. It is preferable the AR camera 225 is disposed close to a windshield.

An image captured by the AR camera 225 may be provided to the processor 270. The description provided with reference to FIG. 7 can be applied to the input device 210 and the biometric sensing unit 230.

The memory 240 is electrically connected to the processor 270 and can store basic data of each unit, control data for controlling the operation of each unit, and input/output data. The memory 240 may be any of various hardware storage devices, such as a ROM, a RAM, an EPROM, a flash drive, and a hard drive. The memory 240 may store various data for the overall operation of the user interface 200, such as programs for the processing or control of the processor 270.

In addition, the memory 240 may be integrated with the processor 270, or may be an element of the processor 270. The interface unit 245 can exchange information, data, or a signal with a different device included in the vehicle 100. Further, the interface unit 245 can transmit the received information, data, or signal to the processor 270. The interface unit 245 can transmit information, data, or a signal generated or processed by the processor 270 to a different device included in the vehicle 100. The interface unit 245 can receive information, data, or a signal from a different device included in the vehicle 100.

The interface unit 245 can receive information about an object located ahead of the vehicle 100 from the object detection apparatus 300. The interface unit 245 can receive driving situation information. The interface unit 245 can also receive information on an object located outside the vehicle 100 from the object detection apparatus 300. For example, the interface unit 245 can receive information on an object located ahead of vehicle 100.

In addition, the interface unit 245 can receive navigation information from the navigation system 770. The interface unit 245 can receive vehicle state information from the sensing unit 120. For example, the interface unit 245 can receive steering angle information from the sensor unit 120. The steering angle information may include information about a degree of change of a steering angle, and information about a speed of change of a steering angle.

Further, the interface unit 245 can receive heading angle information from the sensor unit 120. The heading angle information may include information about a degree of change of a heading angle, and information about a speed of change of heading angle. For example, the interface unit 245 can receive information on a motion of the vehicle 100 from the sensing unit 120.

The interface unit 245 can also receive yaw angle information of the vehicle 100 from the sensing unit 120. The yaw angle information may include information about a degree of change of a yaw angle, and information about a speed of change of a yaw angle. The interface unit 245 can also receive pitch angle information of the vehicle 100 from the sensing unit 120. The pitch angle information may include information about a degree of change of a pitch angle, and information about a speed of change of a pitch angle.

In addition, the interface unit 245 can receive curve information from the object detection apparatus 300 or the navigation system 770. For example, the interface unit 245 can receive information about a curve located within a specific resistance ahead of the vehicle 100. The interface unit 245 can also receive bump information from the object detection apparatus 300 or the navigation system 770. For example, the interface unit 245 can receive information about a bump located within a specific distance ahead of the vehicle 100.

Information, data, or a signal received by the interface unit 245 may be provided to the processor 270. The output device 250 can output information, processed by the processor 270, as at least one of a visual output, an audible output, and a tactile output. The output unit 250 may include a display 251.

Based on the control of the processor 270, the display 251 can output an image of a crop area in a forward view image of the vehicle 100. Based on the control of the processor 270, the display 251 can overlay an AR graphic object, corresponding to the crop area, on the image of the crop area. The display 251 can output an image of a changed crop area based on the control of the processor 270.

Based on the control of the processor 270, the display 251 can overlay a changed AR graphic object on the image of the changed crop area. Further, the display 251 may be elongated in the overall width direction in the lower side of a windshield. Alternatively, the display 251 may be elongated in the overall width direction in the upper side of a dashboard.

The display 251 can output various types of contents other than an image of a crop area, based on the control of the processor 270. For example, the display 251 can display vehicle control-relevant contents, contents for providing various types of information, contents associated with a mobile terminal, etc.

The output unit 250 may further include a sound output unit 252 and a haptic output unit 253 individually or in combination thereof. The processor 270 may be electrically connected to each unit of the user interface apparatus 200. In addition, the processor 270 can control the overall operation of each unit of the user interface apparatus 200. The processor 270 can receive a forward view image of the vehicle 100 from the AR camera 225. The forward view image acquired by the AR camera 225 may be used as an image on which an AR graphic object is overlaid.

In some embodiments, through the interface unit 245, the processor 270 can receive a forward view image of the vehicle 100 from the camera 310 included in the object detection apparatus 300. In this instance, the forward view image acquired by the camera 310 may be used as an image on which an AR graphic object is overlaid.

The processor 270 can receive information about an object located in front of the vehicle 100 from the object detection apparatus 200 through the interface unit 245. The processor 270 can also crop one part of the forward view image of the vehicle 100. In particular, the processor 270 can crop a part of the forward view image in a form suitable to be output through the display unit 251. The camera 310 also has a particular field of view (FOV), and acquire a forward view image depending on the FOV.

The processor 270 can also crop only a necessary part of an acquired forward view image, and output an image of the crop area through the display unit 251. The processor 270 can match object information and the forward view image of the vehicle 100. Specifically, the processor 270 can match an object present in a crop area of the forward view image with object information which is received through the interface unit 245. Further, the processor 270 can control the display 251 to overlay an AR graphic object, corresponding to the crop area, on an image of the crop area.

The processor 270 can also generate an AR graphic object corresponding to an object located in an image of a crop area. The AR graphic object may correspond to an object detected from the image of the crop area. Further, the AR graphic object may include at least one of a carpet image indicative of a moving direction, a turn-by-turn (TBT) image, an object highlight image, a wall image, and a Point of Interest (POI) image.

In addition, the processor 270 can overlay the generated AR graphic object on the image of the crop area and control the display 251 to display an image on which the AR graphic object is overlaid on the image of the crop area. The processor 270 can also receive driving situation information through the interface unit 245 and change a crop area based on the driving situation information received through the interface unit 245.

By changing the crop area, it is possible to provide a user with an image which is appropriate for a driving situation. Based on the driving situation information, the processor 270 can control the display 251 to change an AR graphic object. By changing the AR graphic object, it is possible to provide an AR graphic object which is appropriate for a driving situation, thereby providing a user with accurate information.

Further, driving situation information may include at least one of information about an object located outside the vehicle 100, navigation information, and vehicle state information. For example, the driving situation information may include at least one of steering angle information, heading angle information, yaw angle information, pitch angle information, curve information, and bump information.

The processor 270 can also set a center point in the crop area and change a center point in a front view image based on the driving situation information. In addition, the processor 270 can change the crop area in response to the changing of the center point of the crop area. The processor 270 can also receive steering angle information through the interface unit 245. The steering angle information may include information about a degree of change of a steering angle, and information about a speed of change of the steering angle.

Further, the processor 270 can change a crop area on a front view image by moving the crop area leftward or rightward on the front view image based on the steering angle information. The processor 270 can also determine a degree of movement of the crop area based on the information about a degree of change of a steering angle. For example, the processor 270 can move the crop area in proportion to the degree of change of the steering angle.

The processor 270 can determine a speed of movement of the crop area based on the information on a speed of change of a steering angle. For example, the processor 270 can move the crop area at a speed in proportion to the speed of change of the steering angle. The processor 270 can receive heading angle information through the interface unit 245. The heading angle information may include information about a degree of change of a heading angle, and information about a sped of change in the heading angle. Based on the heading angle information, the processor 270 can change a crop area on a forward view image by moving the crop area leftward and rightward on the forward view image.

The processor 270 can also determine a degree of movement of the crop area based on the information about the degree of change of the heading angle. For example, the processor 270 can move the crop area in proportion to the degree of change of the heading angle.

In addition, the processor 270 can determine a speed of movement of the crop area based on the information about the speed of change of the heading angle. For example, the processor 270 can move the crop area at a speed in proportion to the speed of change of the heading angle. The processor 270 can receive yaw angle information through the interface unit 245. The yaw angle information may include information about a degree of change of a yaw angle, and information about a speed of change of the yaw angle. The processor 270 can change a crop area on a forward view image by moving the crop area leftward or rightward on the forward view image based on yaw angle information.

The processor 270 can determine a degree of movement of the crop area based on the information about a degree in change of a yaw angle. For example, the processor 270 can move the crop area in proportion to the degree of change of the yaw angle.

The processor 270 can determine a speed of movement of the crop area based on the information about a speed of change of a yaw angle. For example, the processor 270 can move the crop area at a speed in proportion to the speed of change of the yaw angle. The processor 270 can receive pitch angle information through the interface unit 245. The pitch angle information may include information about a degree of change of a pitch angle, and information about a speed of change of the pitch angle. The processor 270 can change a crop area on a front view image by moving the crop area upward or downward on the forward view image based on the pitch angle information.

The processor 270 can determine a degree of movement of the crop area based on the information about a degree of change of a pitch angle. For example, the processor 270 can move the crop area in proportion to the degree of change of the pitch angle. Based on the information about a speed of movement of the pitch angle, the processor 270 can determine a speed of change of the crop area. For example, the processor 270 can move the crop area at a speed in proportion to the speed of change of the pitch angle.

The processor 270 can receive a user input trough the input device 210. The processor 270 can control a crop operation based on the user input. For example, based on a first user input, the processor 270 may stop changing a crop area. For example, based on a second user input, the processor 270 can change the size of a crop area, and based on a third user input, the processor 270 can change a position of the crop area. The processor 270 can control the display 251 to overlay a carpet image or a TBT image indicative of a moving direction on a lane present in the crop area.

The processor 270 can control the display 251 to change a position of the carpet image or the TBT image in response to a change of the crop area. If the lane disappears from the displayed image as the crop area is changed, the processor 270 can control the display 251 to make the carpet image or the TBT image disappear. The processor 270 can also control the display 251 to overlay a highlight image on a moving object present in the crop area and control the display 251 to change a position of the highlight image in response to a change of the crop area.

If the moving object disappears from the displayed image as the crop area is changed, the processor 270 can control the display 251 to make the highlight image disappear. The processor 270 can also control the display 251 based on driving situation information to change a size or a color of the highlight image.

Further, the processor 270 can control the display 251 to overlay a wall image on a line present in a crop area and control the display 251 to change a position of the wall image in response to changing of the crop area. The processor 270 can also receive steering angle information through the interface unit 245 and control the display 251 based on the steering angle information to display an AR graphic object which corresponds to an object present on a scheduled travel path of the vehicle 100.

With an AR graphic object being displayed, the processor 270 can change a crop area on a forward view image by moving the crop area leftward or rightward on the forward view image based on the steering angle information. The processor 270 can control the display 251 to overlay an AR graphic object, corresponding to an object, on the changed crop area.

Further, the processor 270 can expand a crop area based on driving situation information. When steering angle information is received through the interface unit 245 with a first content being displayed in a first zone of the display 251, the processor 270 can control the display 251 to an image of the expanded crop area in at least part of the first zone.

The processor 270 can also determine a degree of expansion of the crop area in proportion to a size of a steering angle. The processor 270 can receive speed information through the interface unit 245 and expand or reduce a crop area based on the speed information. When a speed of the vehicle increases, the processor 270 can gradually expand the crop area and when the speed of the vehicle decreases, the processor 270 can gradually reduce the crop area.

Further, the processor 270 can receive information about a curve ahead of the vehicle 100 through the interface unit 245 and change a crop area by moving a crop area leftward or rightward based on the information about the curve. The processor 270 also control the display 251 based on the information about the curve to change an AR graphic object. The processor 270 can receive information about a bump ahead of the vehicle 100 through the interface unit 245. The processor 270 can change a crop area by moving the crop area upward or downward based on the information about the bump.

In addition, the processor 270 can control the display unit 251 based on the information about the bump to change an AR graphic object. The processor 270 can receive a rear view image through the interface unit 245 and crop a part of the rear view image. The processor 270 can control the display 251 to overlay an AR graphic object, corresponding to a crop area of the rear view image, on an image of the crop area.

Further, processor 270 can receive steering angle information through the interface unit 245. Based on the steering angle information, the processor 270 can control the display 251 to change the AR graphic object corresponding to the crop area of the rear view image. Under the control of the processor 270, the power supply unit 290 can supply power required for operation of each unit of the user interface apparatus 200. In particular, the power supply unit 290 can receive power from a battery provided inside a vehicle.

Figure 9:
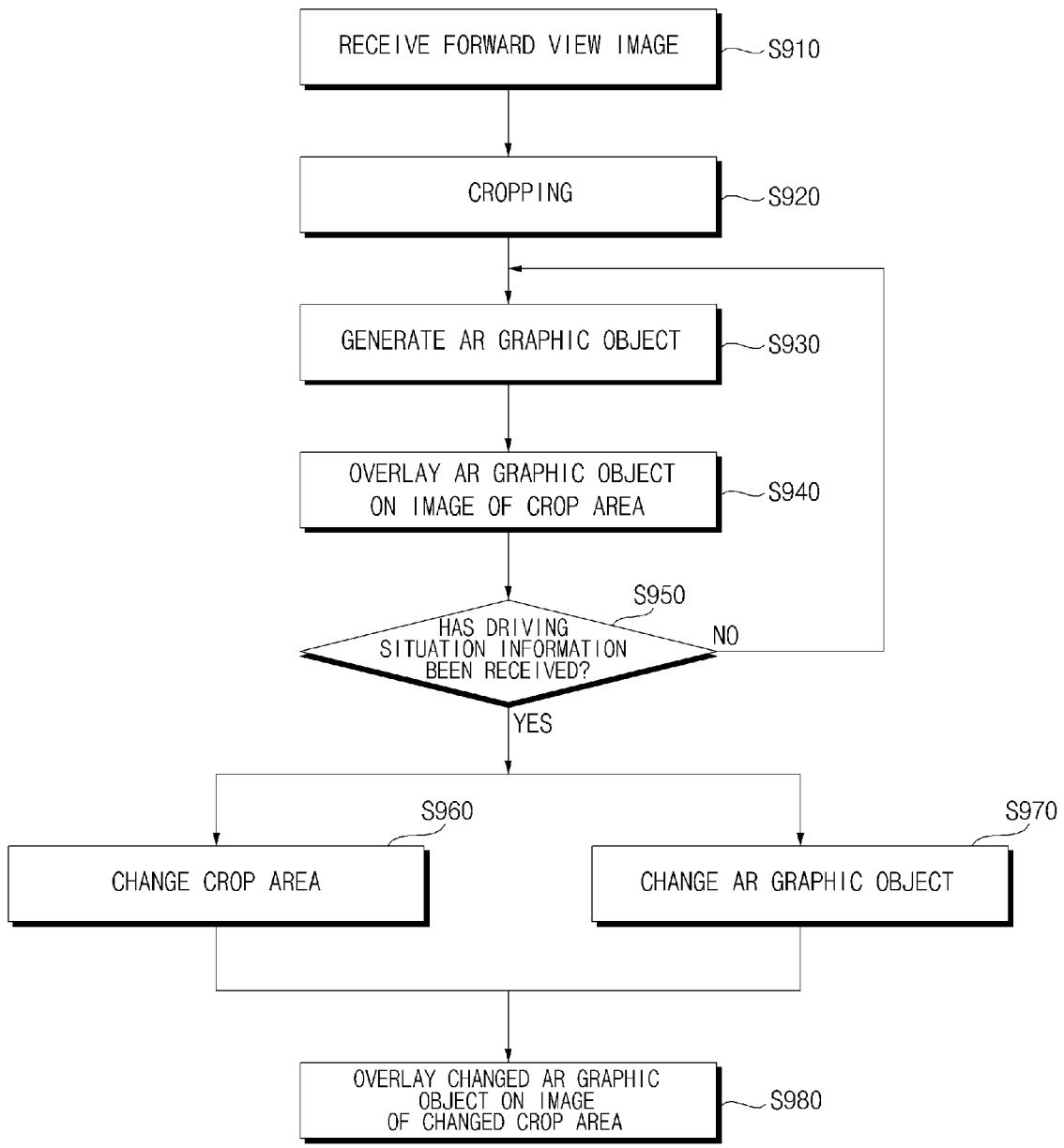
FIG. 9 is a flowchart of a user interface apparatus according to an embodiment of the present invention.

Next, FIG. 9 is a flowchart illustrating a user interface apparatus for vehicle according to an embodiment of the present invention. Referring to FIG. 9, the processor 270 receives a forward view image from the AR camera 225 in S910. For example, the processor 270 can receive a forward view image from the camera 310 of the object detection apparatus 300 through the interface unit 245. In this instance, the forward view image acquired by the camera 310 which detects an object can be used as an image on which the AR graphic object is overlaid.

In addition, the processor 270 crops one part of the forward view image in S920 and generates an AR object which corresponds to an object detected from an image of the crop area in S930. The processor 270 then displays the AR graphic object on the display 251 in a manner such that the AR graphic object is overlaid on the image of the crop area in S940. For example, the processor 270 can display a carpet image or a TBT image indicative of a moving direction on the display 251 in a manner such that the corresponding image is overlaid on a lane of travel present in the image of the crop area.

For example, the processor 270 can display a highlight image on the display 251 in a manner such that the highlight image is overlaid on a moving object present in the image of the crop area. The processor 270 can also display a wall image on the display 251 in a manner such that the wall image is overlaid on a line present in the image of the crop area. Further, the processor 270 can determine whether driving situation information is received through the interface unit 245 in S950. When driving situation information is received (Yes in S950), the processor 270 changes the crop area based on the driving situation information in S960.

When driving situation information is received, the processor 270 changes an AR graphic object based on the driving situation information in S970. The processor 270 then displays the changed AR graphic object on the display 251 in a manner such that the changed AR graphic object is overlaid on the changed crop area in S980.

Figure 10:
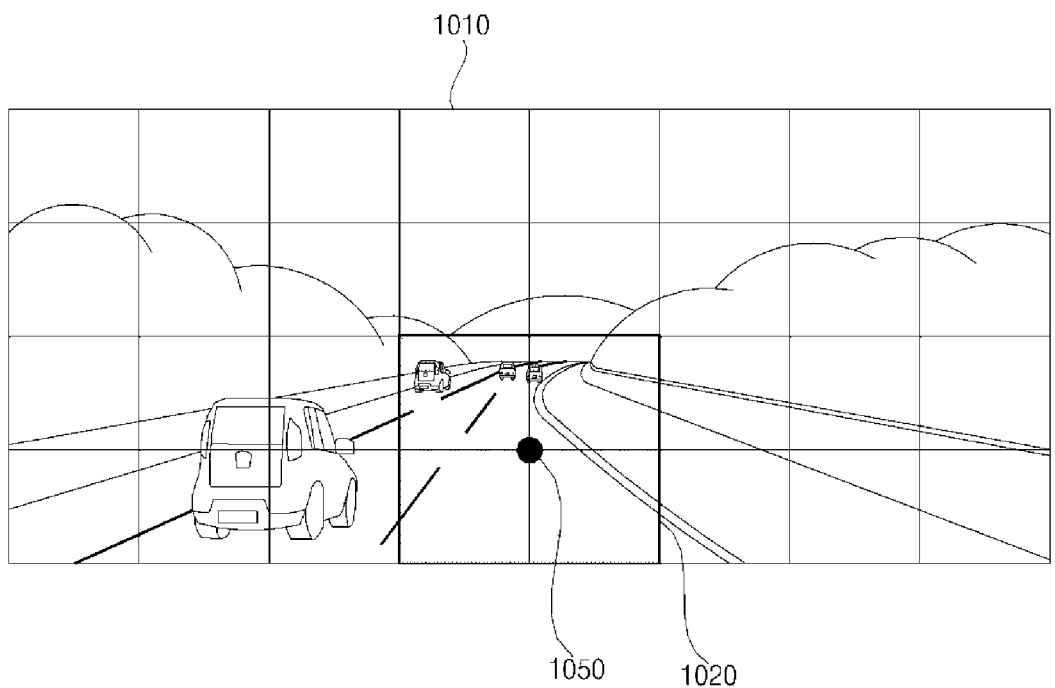
FIG. 10 is a diagram illustrating a crop operation according to an embodiment of the present invention.
Figure 10:
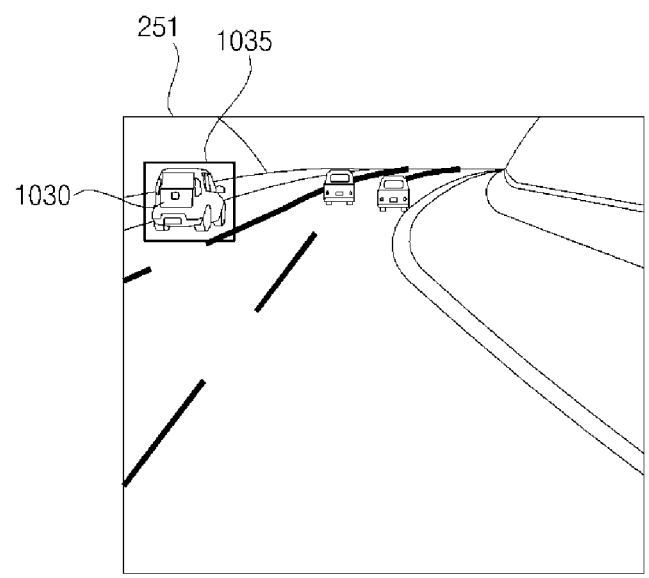

FIG. 10 is a diagram illustrating a crop operation according to an embodiment of the present invention. Referring to FIG. 10, the AR camera 225 can capture a forward view image 1010. The forward view image may be a video or a still image. The processor 170 can receive the forward view image 1010 and crop one part of the forward view image 1010. The processor 270 then controls the display unit 251 to display an image of a crop area 1020.

Cropping can be defined as an operation of cutting off a necessary image from an entire image captured with a field of view (FOV) of the camera 310. For example, the processor 270 can crop a part 1020 necessary for a user from the forward view image 1010 and display the crop area 1020. The processor 270 can crop a part 1020 necessary to control travelling of the vehicle 100 from the forward view image 1010, and display the crop area 1020. The processor 270 can also generate an AR graphic object 1035 which corresponding to an object 1030 detected from an image of the crop area 1020.

The processor 270 can control the display 251 to overlay the AR graphic object 1035, corresponding to the object 1030 detected from the image of the crop area 1020, on the image of the crop area 1020. Further, the processor 270 can receive driving situation information through the interface unit 245 and change the crop area 1020 based on the driving situation information.

The processor 270 can also set a center point 1050 of the crop area 1020 and change the center point 1050 based on the driving situation information. The processor 270 can change the crop area 1020 based on the change of the center point 1050. For example, while moving the center point 1050, the processor 270 can move the crop area 1020 as much as a variation of movement of the center point 1050. While moving the center point 1050, the processor 270 can move the crop area 1020 at the same speed at which the center point 1050 is being moved. The processor 270 can control the display 251 based on the driving situation information to change the AR graphic object 1030.

Figure 11A:
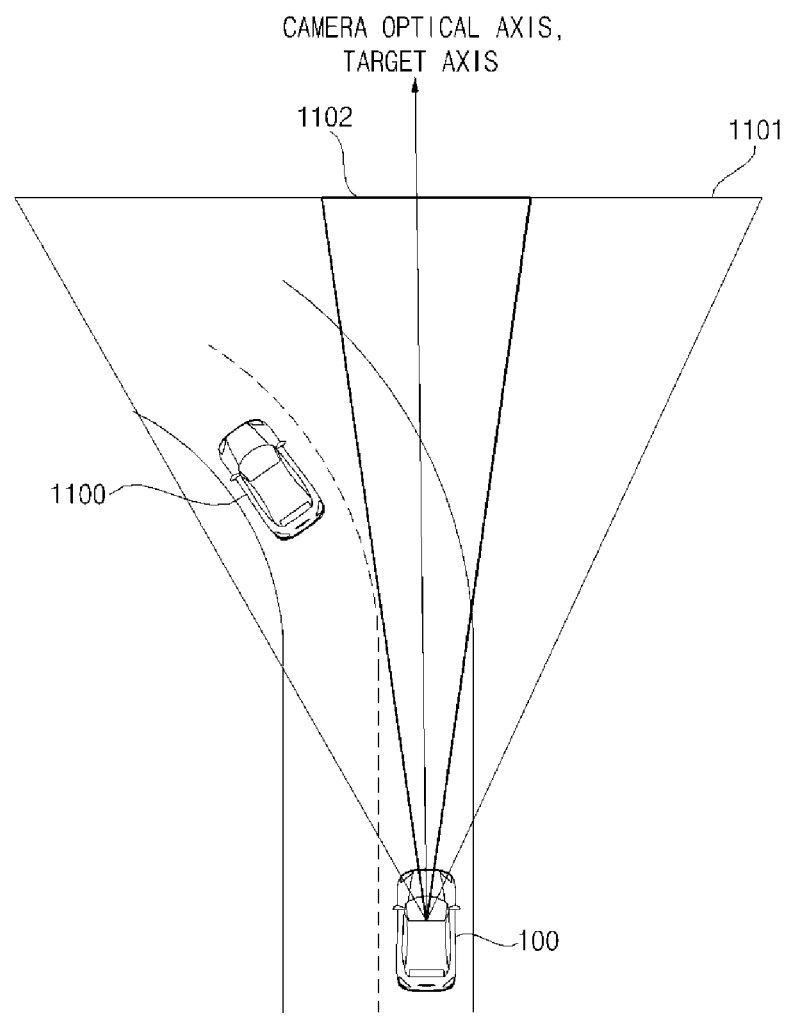
FIGS. 11A and 11B are diagrams illustrating an operation of a user interface apparatus according to an embodiment of the present invention.
Figure 11A:
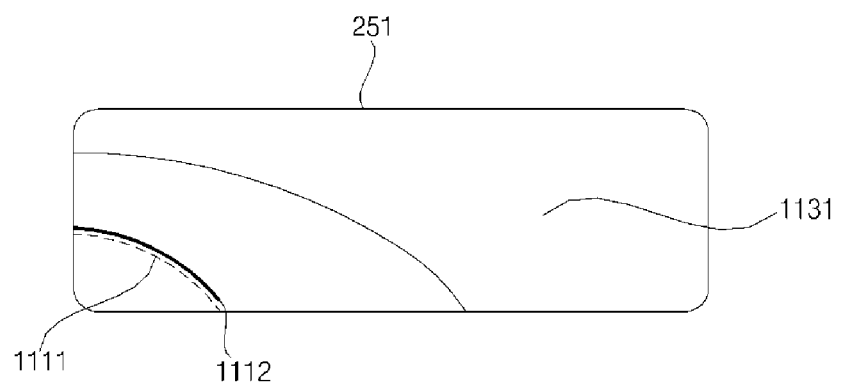
Figure 11B:
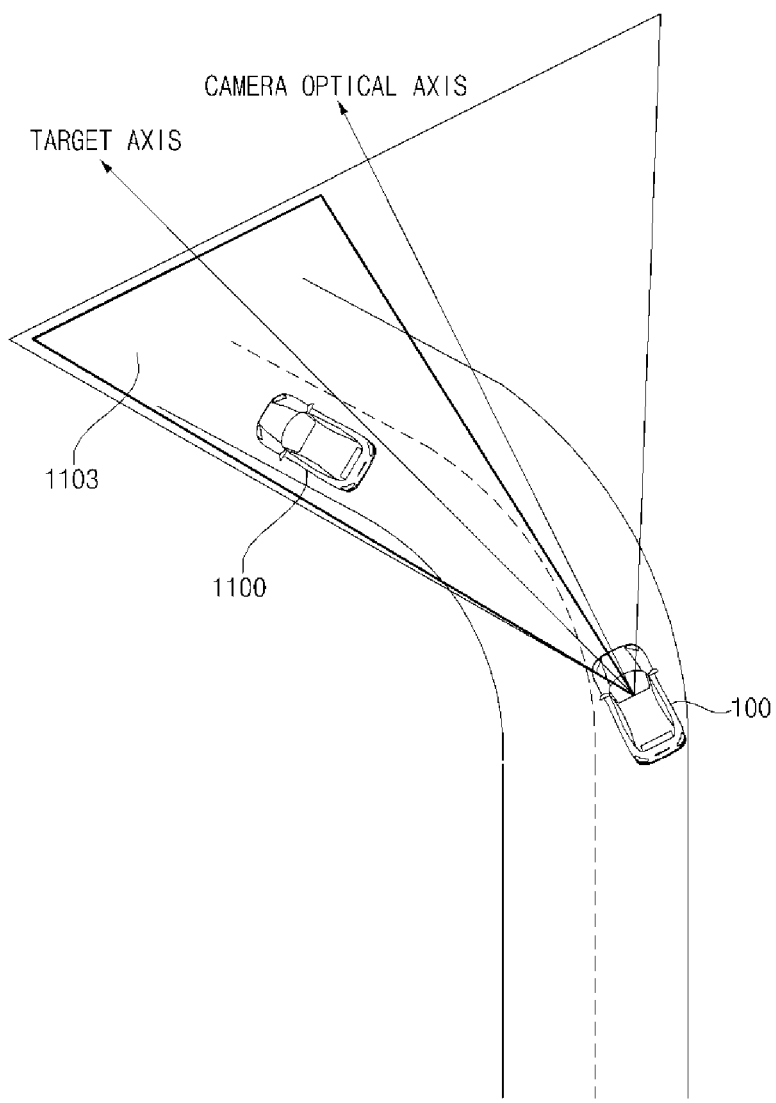
Figure 11B:
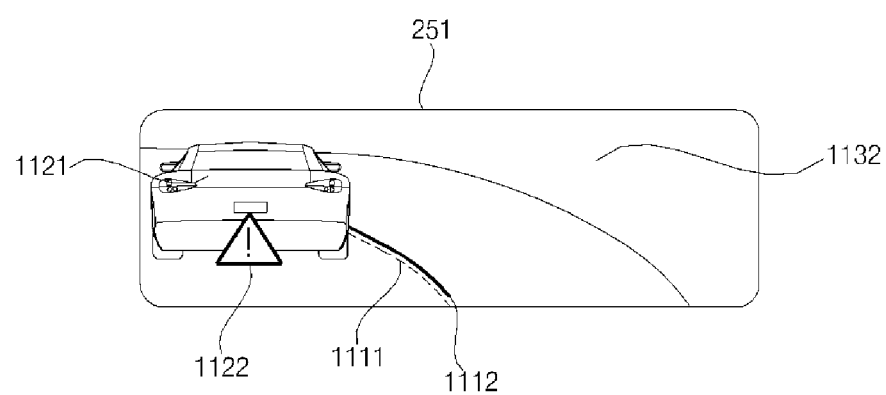

Next, FIGS. 11A and 11B are diagrams illustrating an operation of a user interface apparatus according to an embodiment of the present invention. Through the interface unit 245, the processor 270 can receive at least one of steering angle information, yaw angle information, heading angle information, and curve information.

In addition, the processor 270 can change a crop area based on at least one of the steering angle information, the yaw angle information, the heading angle information, and the curve information. The processor 270 can also control the display 251 based on at least one of the steering angle information, the yaw angle information, the heading angle information, and the curve information to change an AR graphic object.

Referring to FIG. 11A, the camera 310 can capture a forward view image with a predetermined FOV. Reference numeral 1101 indicates a partial region of an image that can be captured in a horizontal direction with the FOV of the camera 310. Reference numeral 1102 indicates a before-change crop region with reference to the horizontal direction. The processor 270 can crop a part of the forward view image, and control the display 251 to output an image 1131 corresponding the cropped part. The processor 270 can also generate an AR graphic object 1112 which corresponds to a traffic line 1111 detected from the image 1131 of the crop area.

Further, the processor 270 can overlay the AR graphic object 1112 on the image 1131 corresponding to the crop area. Another vehicle 1100 may also be travelling ahead of the vehicle 100. When another vehicle 1100 is travelling a curve before the vehicle 100 is yet to enter the curve, if a driving situation is not reflected, the user interface apparatus 200 is not able to provide a user with information about the other vehicle 1100.

Referring to FIG. 11B, the processor 270 can change a cropped region. In particular, reference numeral 1103 indicates a changed crop area. In addition, the processor 270 can receive information about a left curve from the navigation system 770 or the object detection apparatus 300 through the interface unit 245. If a leftward steering input is received in response to the curve, the processor 270 can receive information about a leftward steering angle through the interface unit 245. If a yaw angle is changed leftward in response to the leftward steering input, the processor 270 can receive yaw angle information indicating the leftward change of the yaw angle through the interface unit 245.

If a heading angle is changed leftward in response to the leftward steering input, the processor 270 can receive heading angle information indicating the leftward change of the heading angle through the interface unit 245. Based on at least one of information about the curve, the steering angle information, the heading angle information, and the yaw angle information, the processor 270 can change a crop area on a forward view image by moving the crop area leftward on the forward view image.

The processor 270 can also control the display 251 to display an image 1132 corresponding to the changed crop area. Based on at least one of information about the curve, the steering angle information, the heading angle information, and the yaw angle information, the processor 270 can control the display 251 to move the AR graphic 1112 rightward on a displayed image.

Based on at least one of information about the curve, the steering angle information, the heading angle information, and the yaw angle information, the processor 270 can control the display 251 to display a new graphic object 1122. The graphic object 1122 may correspond to a new object 1122 present in the image 1132 which is displayed on the display 251 due to the change of the crop area.

Figure 12A:
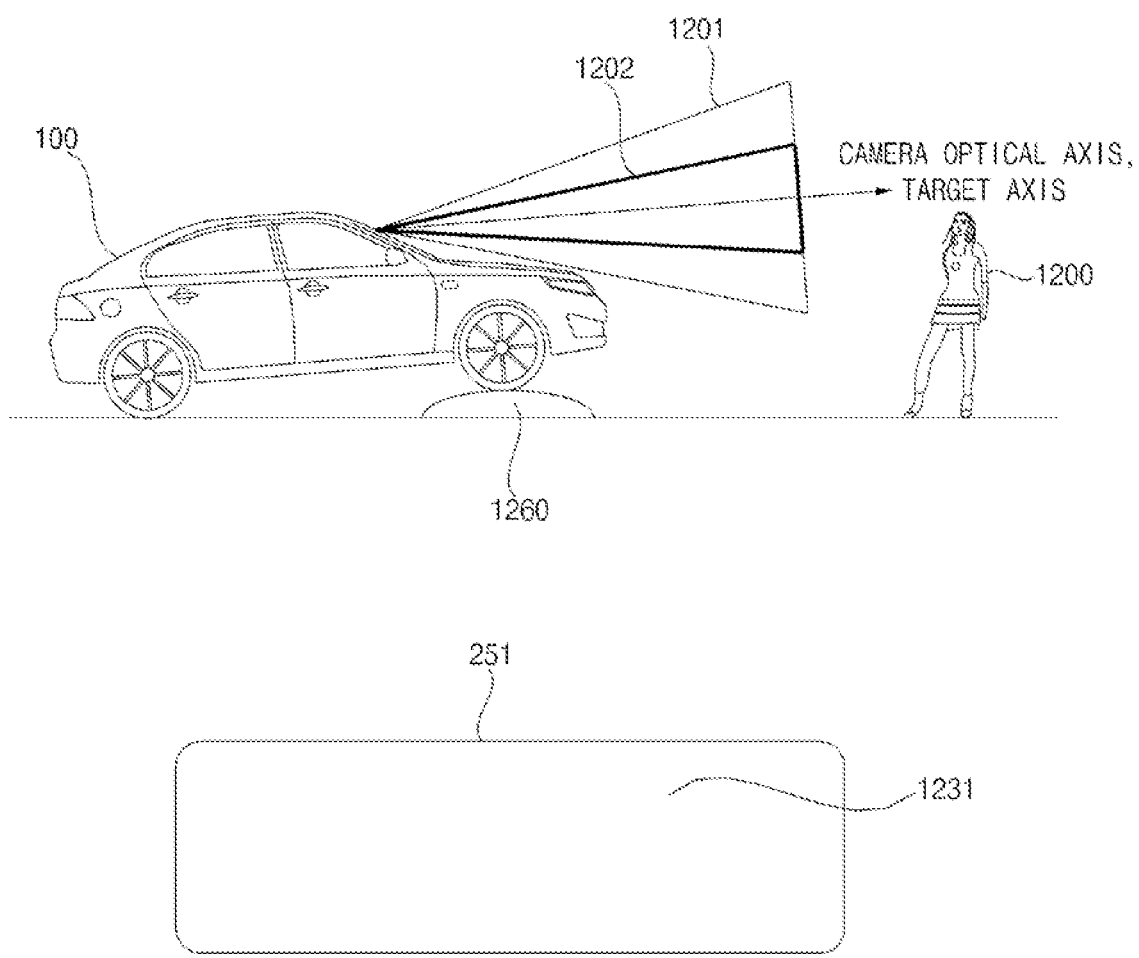
FIGS. 12A and 12B are diagrams illustrating an operation of a user interface apparatus according to an embodiment of the present invention.
Figure 12B:
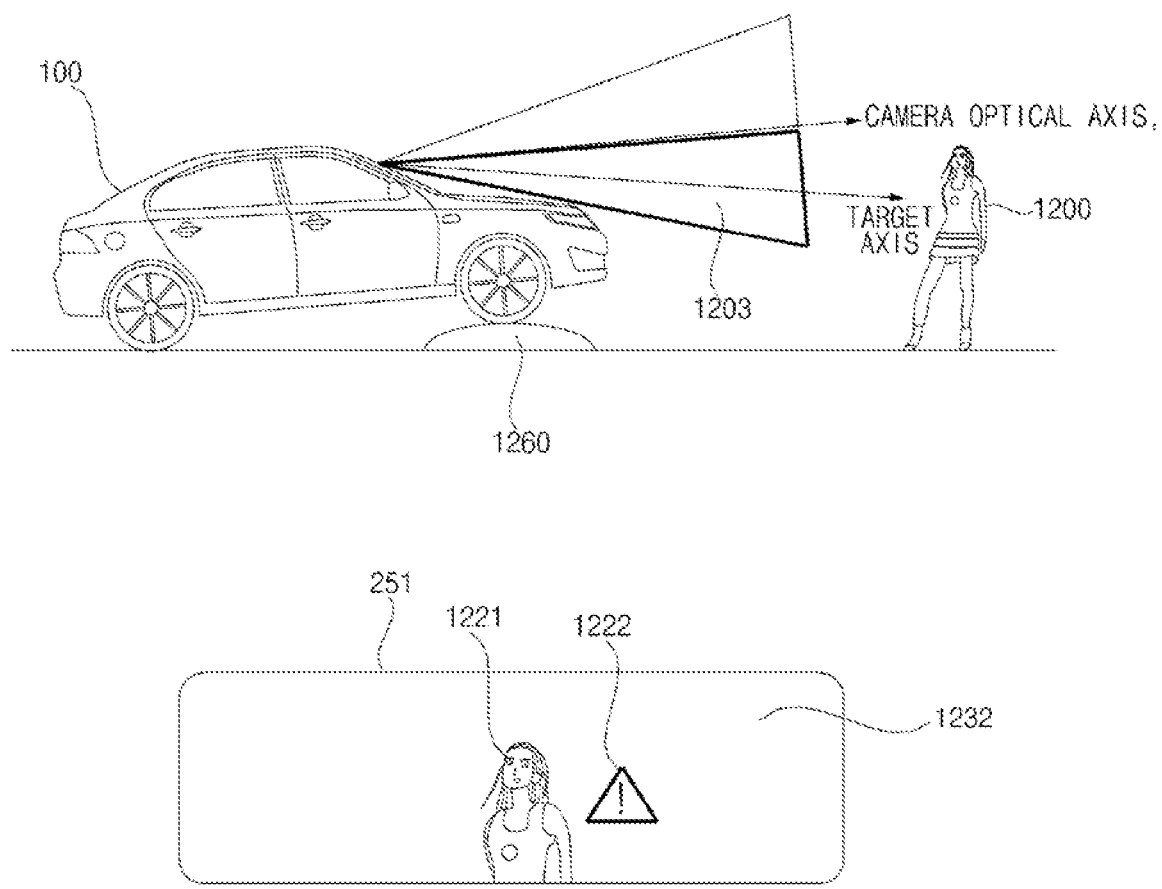

Next, FIGS. 12A and 12B are diagrams illustrating an operation of a user interface apparatus according to an embodiment of the present invention. The processor 270 can receive at least one of pitch angle information and information about a bump 1260 through the interface unit 245 and change a cropping region based on at least one of the pitch angle information and the information about the bump 1260. Based on at least one of the pitch angle information and the information about the bump 1260, the processor 270 can control the display 251 to change an AR graphic object.

Referring to FIG. 12A, the AR camera 225 can capture a forward view image with a preset FOV. Reference numeral 1201 indicates a partial region of an image that is captured in a vertical direction with a FOV of the camera 310, and reference numeral 1202 indicates a before-change cropping region with reference to the vertical direction. The processor 270 can crop one part of the forward view image, and control the display 251 to output an image 1231 corresponding to the crop area.

A pedestrian 1200 may be located ahead of the vehicle 100. When the front wheels of the vehicle 100 passes over the bump 1260, if a driving situation is not reflected, the user interface apparatus 200 may provide a user with information about the pedestrian 1200.

Referring to FIG. 12B, the processor 270 can change a crop area. Reference Numeral 1203 indicates a changed crop area. The processor 270 can receive information about the bump 1260 from the navigation system 770 or the object detection apparatus 300 through the interface unit 245. If a pitch angle is changed upward when the front wheels of the vehicle 100 pass the bump 1260, the processor 270 can receive pitch angle information indicating the upward change of the pitch angle through the interface unit 245.

The processor 270 can also change a crop area on a forward view image by moving the crop area downward on the forward view image, based on at least one of the pitch angle information and the information about the bump 1260. Further, the processor 270 can control the display 251 to display an image 1232 corresponding to the changed crop area. The processor 270 can control the display 251 to display a new AR graphic object 1222, based on at least one of the pitch angle information and the information about the bump 1260. In addition, the graphic object 1122 may correspond to the new AR graphic object 1222 which is present in an image 1232 which is displayed on the display 251 due to the change of the crop area.

Figure 13A:
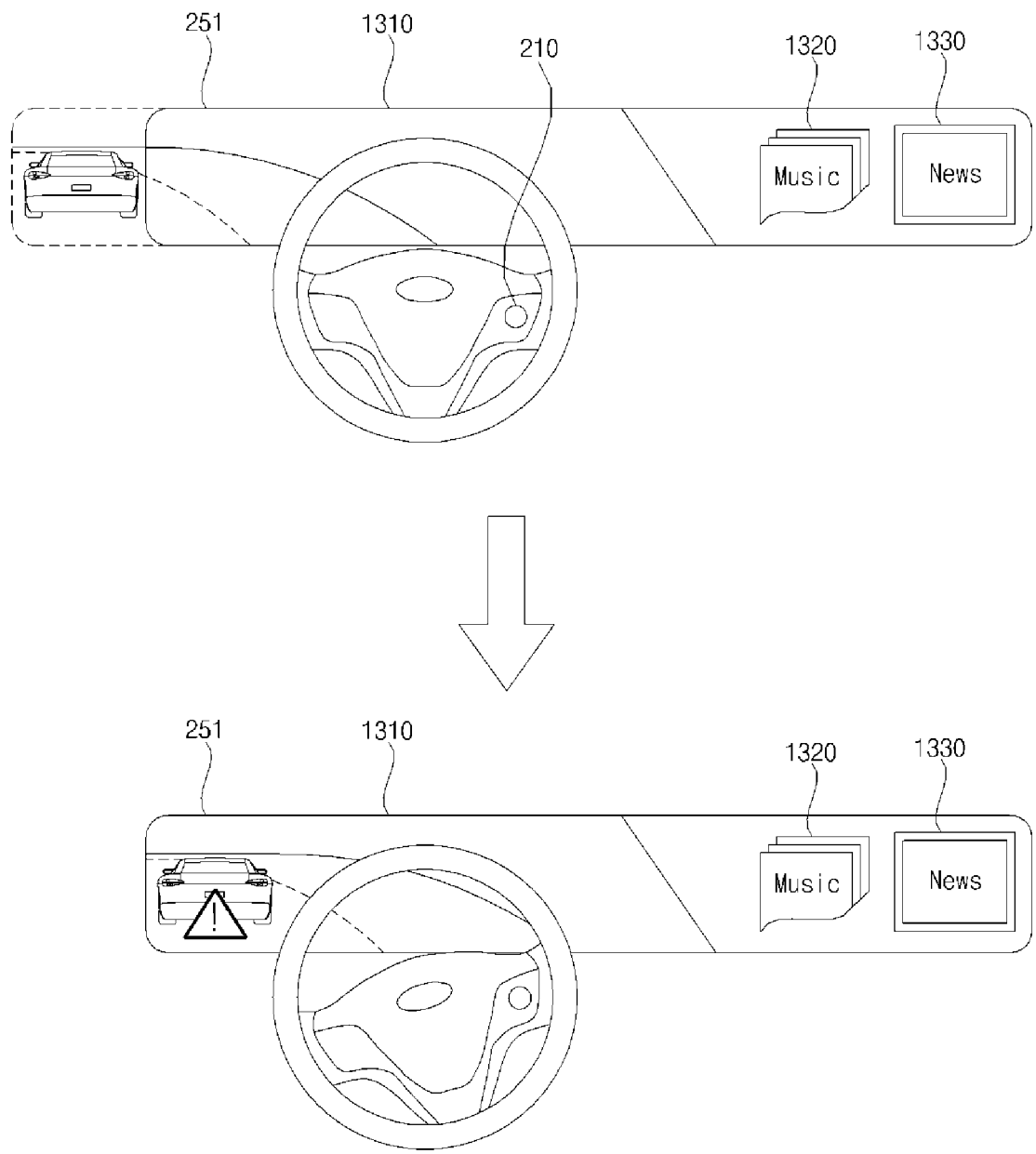
FIGS. 13A and 13B are diagrams illustrating an operation of a user interface apparatus according to an embodiment of the present invention.
Figure 13B:
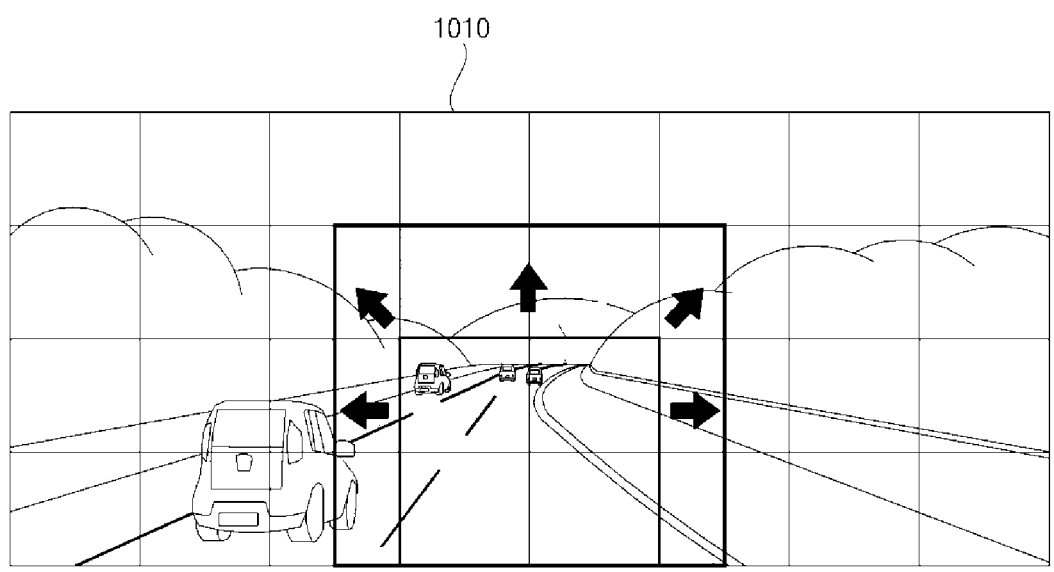

FIGS. 13A and 13B are diagrams illustrating an operation of a user interface apparatus according to an embodiment of the present invention. Referring to FIG. 13A, the processor 270 can control the display 251 to display a graphic object based on various types of information or data. For example, the processor 270 can control the display 251 to display Audio Video (AV)-relevant graphic object 1320 and news-relevant graphic object 1330 in addition to a cropped image 1310.

The processor 270 can change a crop area based on information received through the interface unit 245. For example, the processor 270 can control a crop operation based on a user input received through the input device 210. The processor 270 can also control a crop operation based on a user input, received through the input device 210, preferentially rather than information received through the interface. For example, if a first user input for stopping changing a crop area is received through the user input device 210 while a steering input is received, the processor 270 can stop changing the crop area.

Referring to FIG. 13B, if a user input is received through the input device 210 even when any information is not received through the interface unit 245, the processor 270 can control changing a crop area. For example, if a second user input is received through the input device 210 while any information is received through the interface unit 245, the processor 270 can change the size of a crop area.

In addition, the processor 270 can increase the size of the crop area based on the second user input. For example, the processor 270 can decrease the size of the crop area based on the second user input. The processor 270 can change the size of the crop area in at least one direction among an up direction, a down direction, a left direction, and a right direction.

Figure 14:
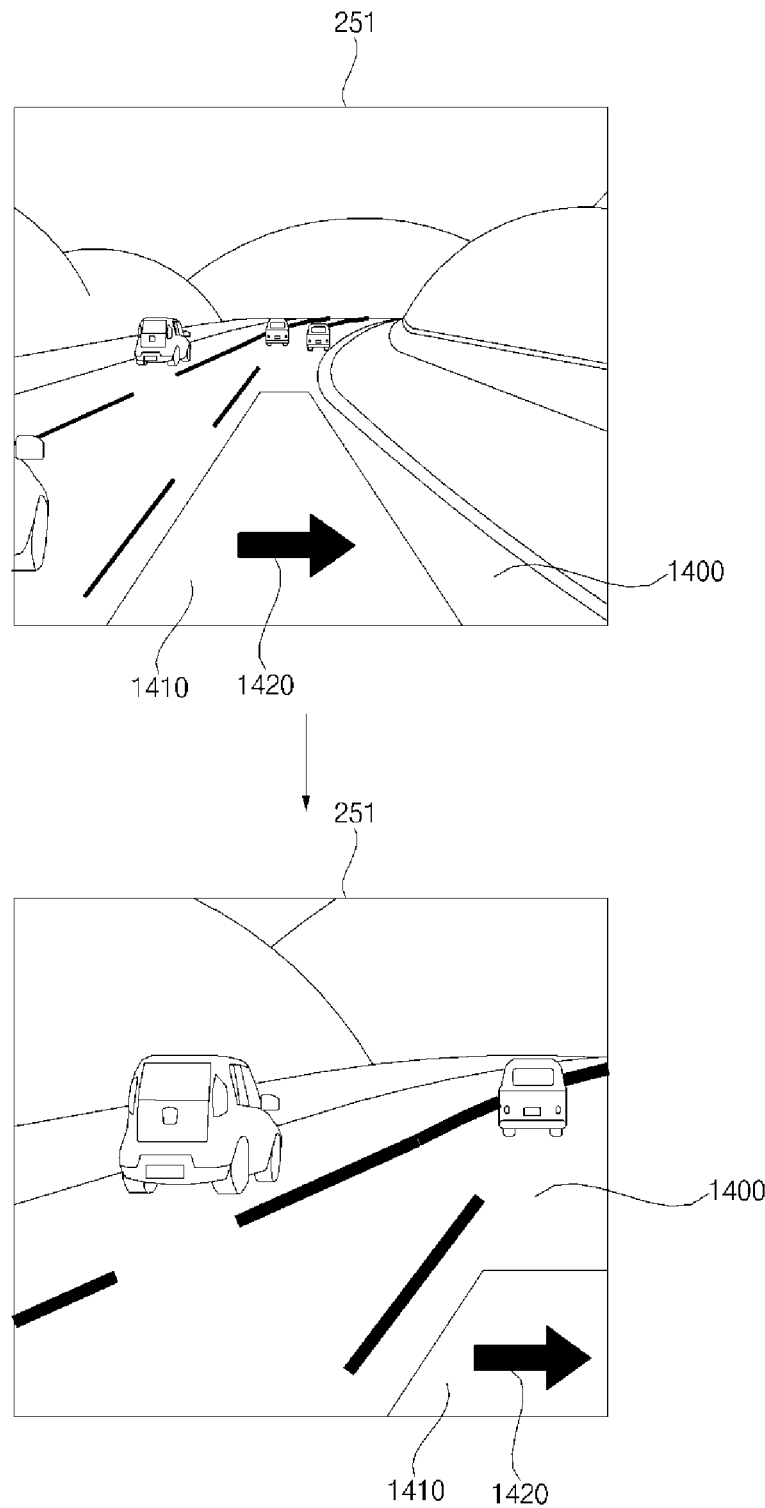
FIG. 14 is a diagram illustrating an operation of a user interface apparatus according to an embodiment of the present disclosure.

Next, FIG. 14 is a diagram illustrating an operation of a user interface apparatus according to an embodiment of the present disclosure. Referring to FIG. 14, the processor 270 can control the display 251 to display an image of a crop area. The processor 270 can control the display 251 to overlay a carpet image 1410 or a TBT image 1420 indicative of a scheduled moving direction on a lane 1400 present in the crop area. When indicating a scheduled direction of travel of a vehicle, the carpet image 1410 may be defined as an AR graphic object which appears rolled out on a roadway. In addition, the TBT image 1420 may be defined as an AR graphic object which is an arrow indicative of a scheduled moving direction.

In addition, the processor 270 can receive driving situation information through the interface unit 245 and change a crop area based on the driving situation information. The processor 270 can also control the display 251 to display an image of the changed crop area. Based on the driving situation information, the processor 270 can control the display 251 to change the carpet image 1410 or the TBT image 1420.

As illustrated in FIG. 14, when there is a change in at least one of a leftward steering angle, a leftward yaw angle, and a leftward head angle, the processor 270 can change a crop area. In this instance, based on the change in a change in at least one of the leftward steering angle, the leftward yaw angle, and the leftward head angle, the processor 270 can move the carpet image 1410 or the TBT image 1420 to the right side, from a user's perspective, on the screen of the display 251.

Figure 15:
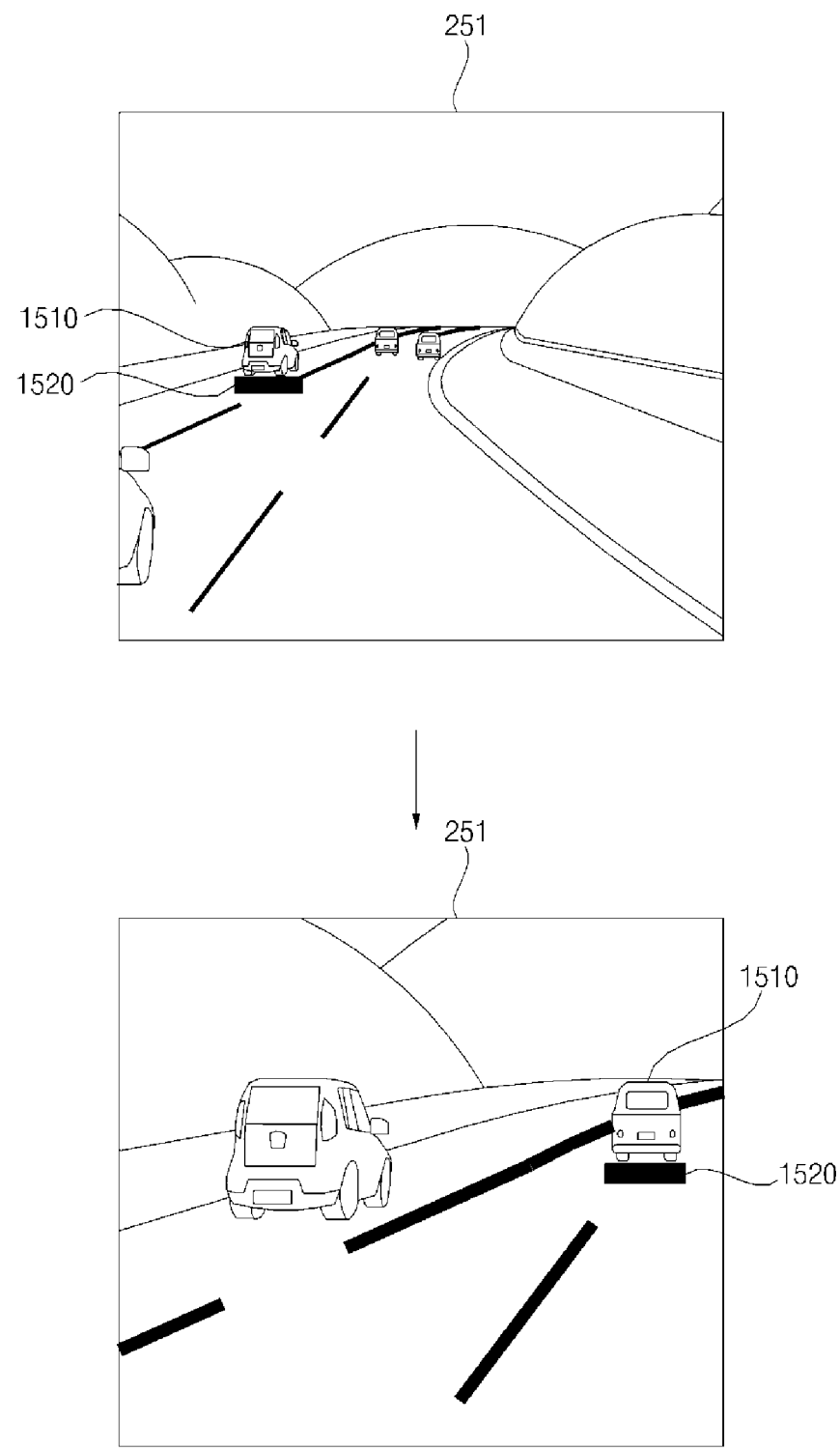
FIG. 15 is a diagram illustrating an operation of a user interface apparatus according to an embodiment of the present invention.

FIG. 15 is a diagram illustrating an operation of a user interface apparatus according to an embodiment of the present invention. Referring to FIG. 15, the processor 270 can control the display 251 to display an image of a crop area and control the display 251 to overlay a highlight image 1520 on a moving object 1510 present in a crop area. The highlight image 1520 may be defined as an AR graphic object displayed in the vicinity of the moving object which a user needs to watch out.

The processor 270 can also receive driving situation information through the interface unit 245 and change a crop area based on the driving situation information. The processor 270 can control the display 251 to display an image of the changed crop area and can control the display 251 based on the driving situation information to change the highlight image 1520.

As illustrated in FIG. 15, if there is a change in at least one of a leftward steering angle, a leftward yaw angle, and a leftward heading angle, the processor 270 can change a crop area. In this instance, based on the change in at least one of the leftward steering angle, the leftward yaw angle, and the leftward heading angle, the processor 270 can move the highlight image 1520 to the right side, from the user's perspective, on the screen of the display 251.

Figure 16:
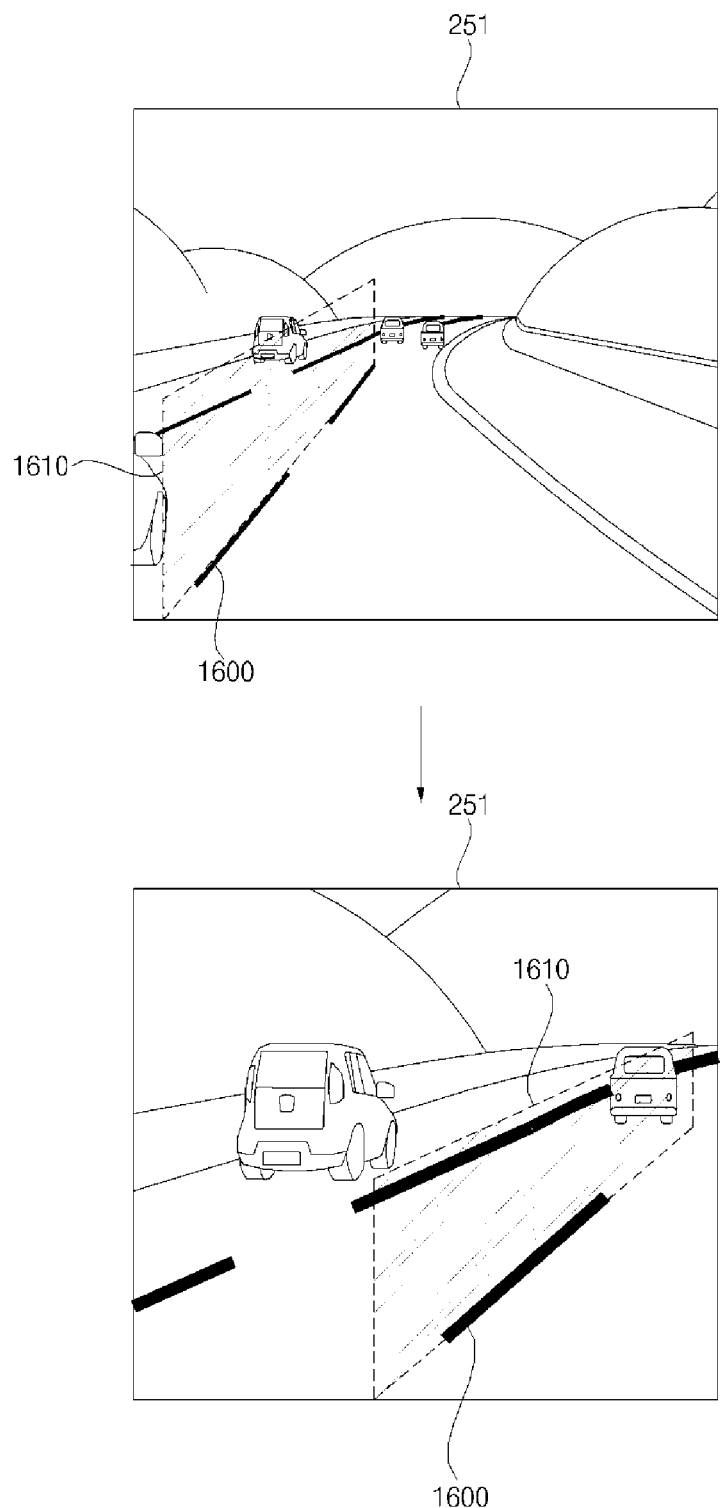
FIG. 16 is a diagram illustrating an operation of a user interface apparatus according to an embodiment of the present invention.

Next, FIG. 16 is a diagram illustrating an operation of a user interface apparatus according to an embodiment of the present invention. Referring to FIG. 16, the processor 170 can control the display 251 to display an image of a crop area. The processor 270 can control the display 251 to overlay a wall image 1610 on a line 1600 present in the crop area. The wall image 1610 may be defined as a three-dimensional (3D) graphic object which is present on the line 1600 to guide a host vehicle to travel in the inside lane.

The processor 270 can also receive driving situation information through the interface unit 245 and change the crop area based on the driving situation information. Further, the processor 270 can control the display 251 to display an image of the changed crop area and control the display 251 based on the driving situation information to change the wall image 1610.

As illustrated in FIG. 16, if there is a change in at least one of a leftward steering angle, a leftward yaw angle, and a leftward heading angle, the processor 270 can change the crop area. In this instance, based on the change in at least one of the leftward steering angle, the leftward yaw angle, and the leftward heading angle, the processor 270 can move the wall image 1610 to the right side, from a user's perspective, on the screen of the display 251.

Figure 17:
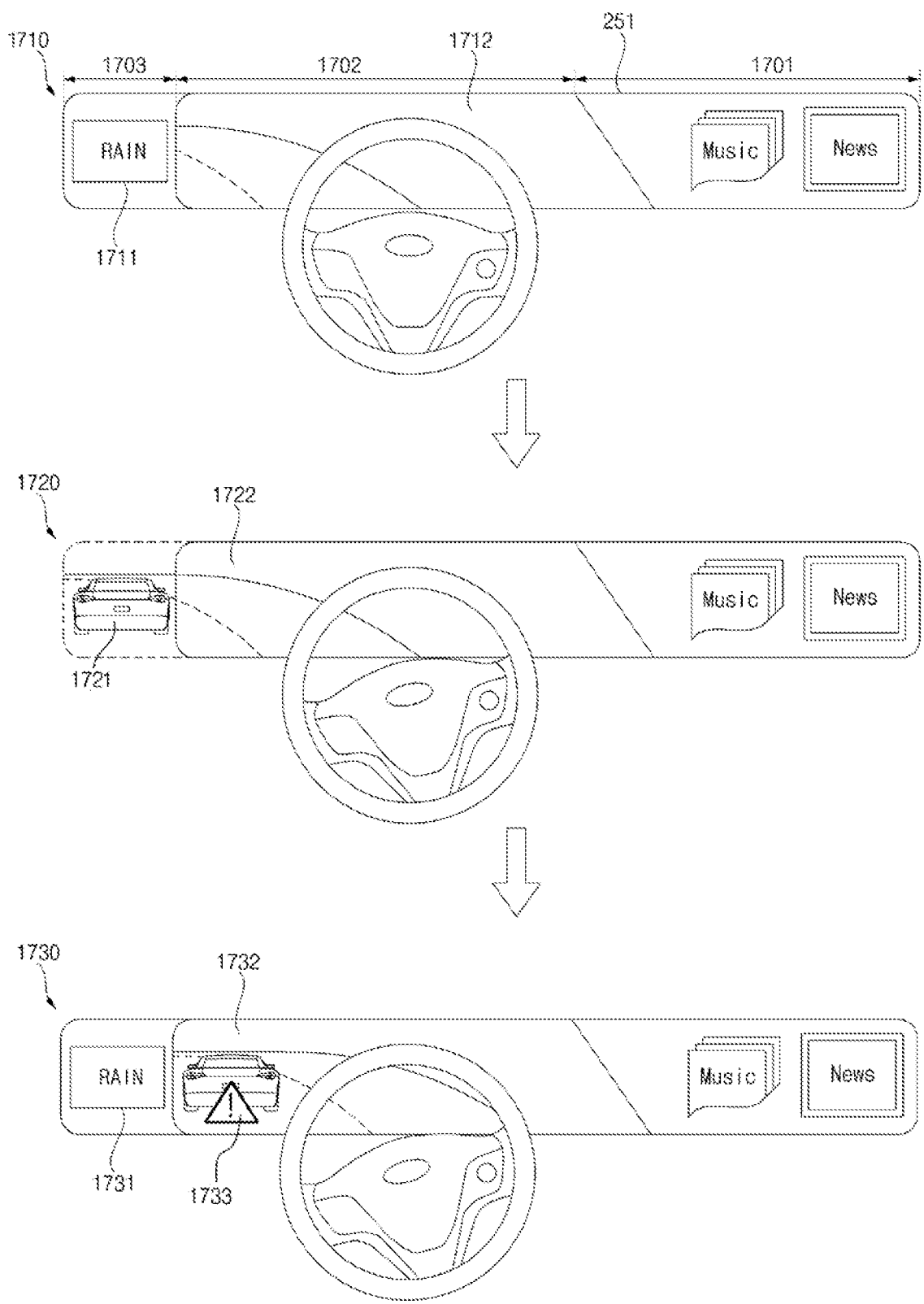
FIG. 17 is a diagram illustrating an operation of a user interface apparatus according to an embodiment of the present invention.

FIG. 17 is a diagram illustrating an operation of a user interface apparatus according to an embodiment of the present invention. As illustrated in reference numeral 1710, the processor 270 can divide the display 251 into a plurality of zones to display various kinds of contents. In more detail, the display 251 may be divided into first, second, and third zones 1701, 1702, and 1703. The processor 270 can then display an image of a crop area in the second zone 1702 of the display 251.

The processor 270 can display entertainment content and news content in the first zone 1701 of the display 251. The processor 270 can display weather content in the third zone 1703 of the display 251. As illustrated in reference numeral 1720, the processor 270 can receive information about at least one of a leftward steering angle, a leftward yaw angle, and a leftward heading angle.

The processor 270 can expand a crop area to the left side, and control the display 251 to display an object 1721 in at least part of the third zone 1703. In this instance, the existing displayed weather content may disappear. Further, The processor 270 can control the display 251 to display the object 1721 in the third zone 1703 along with the existing displayed content. In this instance, the processor 270 may process the existing displayed content to have a specific transparency. In addition, the processor 270 may process the object 1721 to have a specific transparency. The object 1721 may be located along a scheduled travel path of a vehicle.

As illustrated in reference numeral 1730 the processor 270 can change a crop area on a forward view image by moving the crop area leftward on the forward view image, based on information about at least one of a leftward steering angle, a leftward yaw angle, and a leftward heading angle.

The processor 270 can control the display 251 so that an AR graphic object 1733 corresponding to the object 1721 present in the changed crop area is displayed in an overlapping manner. The processor 270 can receive information about at least one of a rightward steering angle, a rightward yaw angle, and a rightward heading angle.

In addition, the processor 270 can expand a crop area to the right side and control the display 251 to display an object in at least part of the first zone 1701. In this instance, the existing displayed entertainment and news contents may disappear. Then, the processor 270 can change the crop area by moving the crop area rightward on the forward view image, based on the information at least one of the rightward steering angle, the rightward yaw angle, and the rightward heading angle. The processor 270 can also control the display 251 to overlay an AR graphic object, corresponding to an object, on the changed crop area.

Figure 18:
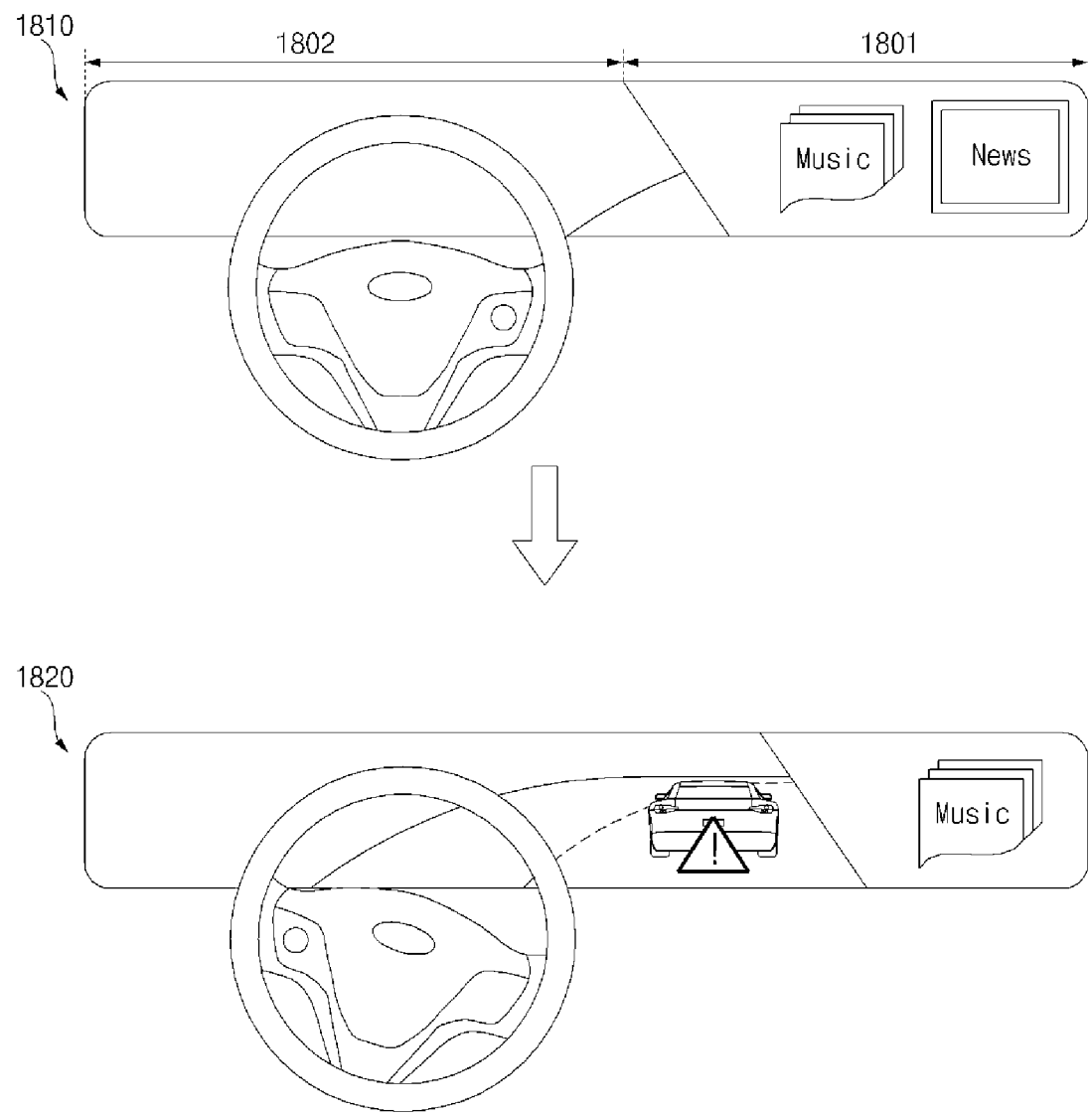
FIG. 18 is a diagram illustrating an operation of a user interface apparatus according to an embodiment of the present invention.

Next, FIG. 18 is a diagram illustrating an operation of a user interface apparatus according to an embodiment of the present invention. Referring to FIG. 18, the processor 270 can expand or reduce a crop area based on driving situation information. For example, the processor 270 can expand or reduce a crop area based on a speed of the vehicle 100. For example, the processor 270 can expand or reduce a crop area based on information about at least one of a steering angle, a yaw angle, and a heading angle. As illustrated in reference numeral 1810, the display 251 may be divided into first and second zones 1801 and 1802.

The processor 270 can display an image of the crop area in the second zone 1802 of the display 251. Further, the processor 270 can display entertainment content and news content in the first zone 1801 of the display 251. As illustrated in reference numeral 1820, the processor 270 can receive information about at least one of a rightward steering angle, a rightward yaw angle, and a rightward heading angle. In this instance, the processor 270 can expand the crop area to the right side, and control the display 251 to display the image of the expanded crop area. In this instance, the existing displayed entertainment content may disappear.

The processor 270 can control the display 251 to display an image of the expanded crop area in the first zone 1801 along with an existing displayed content. In this instance, the processor 270 can process the existing displayed content to have a specific and also process the image of the expanded crop area to have a specific transparency.

Further, the processor 270 can determine a degree of expansion of a cropped image in proportion to at least one of the steering angle, the yaw angle, and the heading angle, and can determine the number of contents to disappear, depending on the degree of expansion of the crop area.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:
1. A user interface apparatus for a vehicle, comprising:
an interface unit;
a display; and
a processor configured to:

display a cropped area of a forward view image on the display in which an object is present in the displayed cropped area,
display a first augmented reality (AR) graphic object overlaid onto the object present in the displayed cropped area,
change the cropped area based on driving situation information received through the interface unit, and
change the first AR graphic object based on the driving situation information,
wherein the forward view image is received through the interface unit,
wherein the processor is further configured to:
display a wall image overlaid on a line present in the cropped area, and
change a position of the wall image based on the driving situation information,
wherein the wall image is a three-dimensional (3D) graphic object which is present on the line to guide a host vehicle to travel inside a lane,
wherein the processor is further configured to:
receive information about a bump located ahead of the vehicle through the interface unit,
receive pitch angle information indicating an upward change of a pitch angle through the interface unit,
change the cropped area by moving the cropped area downward on the forward view image based on at least one of the pitch angle information and the information about the bump when front wheels of the vehicle pass the bump, and
based on at least one of the pitch angle information and the information about the bump, change the first AR graphic object, and
wherein the first AR graphic object corresponds to a new object present in an image displayed on the display due to the change of the cropped area.

2. The user interface apparatus according to claim 1, wherein the processor is further configured to:
set a center point in the cropped area; and
change a center point in the forward view image based the driving situation information.

3. The user interface apparatus according to claim 1, wherein the processor is further configured to:
receive steering angle information through the interface unit, and
based on the steering angle information, change the cropped area on the forward view image by moving the cropped area leftward or rightward on the forward view image.

4. The user interface apparatus according to claim 1, wherein the processor is further configured to:
receive yaw angle information through the interface unit, and
based on the yaw angle information, change the cropped area on the forward view image by moving the cropped area leftward or rightward on the forward view image.

5. The user interface apparatus according to claim 1, wherein the processor is further configured to:
receive heading angle information through the interface unit, and
based on the heading angle information, change the cropped area on the forward view image by moving the cropped area leftward or rightward on the forward view image.

6. The user interface apparatus according to claim 1, further comprising:
an input device configured to receive a user input,
wherein the processor is further configured to:
stop changing the cropped area based on a first user input.

7. The user interface apparatus according to claim 6, wherein the processor is further configured to, based on a second user input, change a size of the cropped area.

8. The user interface apparatus according to claim 1, wherein the processor is further configured to:
display an overlaid carpet image or a turn-by-turn (TBT) image indicative of a scheduled moving direction on a lane present in the cropped area, and
in response to the changing of the cropped area, change a position of the carpet image or the TBT image.

9. The user interface apparatus according to claim 1, wherein the processor is further configured to:
display a highlight image overlaid on a moving object present in the cropped area, and
in response to the changing of the cropped area, change a position of the highlight image.

10. The user interface apparatus according to claim 9, wherein the processor is further configured to, based on the driving situation information, change a size or a color of the highlight image.

11. The user interface apparatus according to claim 1, wherein the processor is further configured to:
receive steering angle information through the interface unit,
based on the steering angle information, display an object present on a scheduled travel path of the vehicle, and
change the cropped area on the forward view image by moving the cropped area leftward or rightward on the forward view image based on the steering angle information, and display an AR graphic object, corresponding to the object, overlaid on the changed cropped area.

12. The user interface apparatus according to claim 1, wherein the processor is further configured to expand the cropped area based on the driving situation information.

13. The user interface apparatus according to claim 1, wherein the processor is further configured to:
receive information about a curve located ahead of the vehicle through the interface unit,
change the cropped area by moving the cropped area leftward or rightward based on the information about the curve, and
based on the information about the curve, change the first AR graphic object.

14. The user interface apparatus according to claim 1, wherein the processor is further configured to:
receive a rear view image of the vehicle through the interface unit,
crop a part of the rear view image,
display an AR graphic object, corresponding to a cropped area of the rear view image, overlaid on an image of the cropped area of the rear view image,
change the cropped area of the rear view image based on information about a steering angle received through the interface unit, and
based on the information about the steering angle, change an AR graphic object corresponding to the cropped area of the rear view image.

15. The user interface apparatus according to claim 1, wherein the processor is further configured to:
receive information about a steering angle through the interface unit while at least one content is displayed in a first zone of the display,
based on the information about the steering angle, display an image of the cropped area expanded into at least part of the first zone, and determine a degree of expansion of the image of the cropped area in proportion of a size of the steering angle, and a number of contents to disappear from the first zone depending on the degree of expansion of the image of the cropped area.

16. A vehicle comprising a user interface apparatus according to claim 1.

* * * * *